US011907740B2

(12) United States Patent
Kawamura

(10) Patent No.: US 11,907,740 B2
(45) Date of Patent: Feb. 20, 2024

(54) METHOD FOR CREATING RPA SCRIPT DATA, METHOD FOR EXECUTING RPA SCRIPT DATA, TERMINAL DEVICE, IMAGE PROCESSING APPARATUS, RPA SCRIPT DATA, AND PROGRAM

(71) Applicant: Konica Minolta, Inc., Tokyo (JP)

(72) Inventor: Yuichi Kawamura, Asaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/135,223

(22) Filed: Apr. 17, 2023

(65) Prior Publication Data
US 2023/0385081 A1    Nov. 30, 2023

(30) Foreign Application Priority Data
May 31, 2022  (JP) ................................ 2022-089001

(51) Int. Cl.
| G06F 9/451 | (2018.01) |
| G06F 11/30 | (2006.01) |
| G06F 8/34 | (2018.01) |
| G06F 9/455 | (2018.01) |
| G06F 11/34 | (2006.01) |
| G06Q 10/10 | (2023.01) |

(52) U.S. Cl.
CPC ............... *G06F 9/451* (2018.02); *G06F 8/34* (2013.01); *G06F 9/45512* (2013.01); *G06F 11/3041* (2013.01); *G06F 11/3438* (2013.01); *G06Q 10/10* (2013.01)

(58) Field of Classification Search
CPC ..................................................... G06F 9/451
See application file for complete search history.

(56) References Cited

U.S. PATENT DOCUMENTS

| 2018/0329399 A1* | 11/2018 | Neelakandan ... G06Q 10/06315 |
| 2020/0356465 A1* | 11/2020 | Li ........................ G06F 11/3664 |
| 2021/0109722 A1* | 4/2021 | Ripa .......................... G06F 8/34 |
| 2021/0110233 A1* | 4/2021 | Voicu .................. G06F 3/04817 |
| 2023/0236910 A1* | 7/2023 | Marinovici ............. G06F 40/14 715/234 |
| 2023/0289389 A1* | 9/2023 | Leedekerken ...... G06F 16/9532 707/706 |
| 2023/0311322 A1* | 10/2023 | Marinovici ............. H04L 67/02 700/264 |

FOREIGN PATENT DOCUMENTS

JP    2016-144097 A    8/2016

* cited by examiner

*Primary Examiner* — Asher D Kells
(74) *Attorney, Agent, or Firm* — RANKIN, HILL & CLARK LLP

(57) ABSTRACT

A method for creating robotic process automation (RPA) script data to perform an operation in a terminal device that displays an operation screen for an image processing apparatus on a host terminal and receives the operation by the RPA, includes: detecting a position of an operation target displayed on the operation screen and selected by an operator; and normalizing the detected position of the operation target on a basis of a size of the operation screen, generating position information indicating the normalized position, and describing the position information in the RPA script data.

6 Claims, 15 Drawing Sheets

METHOD FOR CREATING RPA SCRIPT DATA, METHOD FOR EXECUTING RPA SCRIPT DATA, TERMINAL DEVICE, IMAGE PROCESSING APPARATUS, RPA SCRIPT DATA, AND PROGRAM

The entire disclosure of Japanese patent Application No. 2022-089001, filed on May 31, 2022, is incorporated herein by reference in its entirety.

BACKGROUND

Technological Field

The present invention relates to a method for creating RPA script data to be executed by a terminal device in a case where the terminal device performs an operation by RPA, and a method for executing the RPA script data.

Description of the Related Art

A conventional method for creating RPA script data is what is called RPA programming, and is performed by describing the content of an operation by RPA with respect to a desktop screen according to the grammar of a programming language such as Python (registered trademark), VB Script (registered trademark), VB.NET (registered trademark), GAS (registered trademark), or C#(registered trademark). Robotic process automation (RPA) is a technique of causing a program to substitute and automate an operation on an operation screen which has been manually performed by a human in the related art. Various functions such as a mouse automatic control function, a keyboard automatic input function, a screenshot automatic creation function, an image recognition function, and a message box function can be used for the automation. By combining these, in the RPA, it is possible to achieve various types of desk works at a level comparable to that performed by a person in charge of a clerical job.

The position of an operation target to be operated by the RPA is expressed by a coordinate system of what is called a desktop screen, that is, a screen displayed in the highest hierarchy in the operating system. On the other hand, there is an increasing need to create RPA script data for remote panel systems in recent years. JP 2016-144097 A discloses a remote panel system that operates an image processing apparatus using a terminal device. The terminal device displays a bitmap corresponding to an operation screen of the image processing apparatus, receives designation of the position of the operation target to be operated from an operator, and causes the image processing apparatus to execute processing according to the designation. When the RPA script data is created so as to automatically designate the position of the operation target to be operated, the creator of the RPA script data can cause the RPA to execute an operation of the image processing apparatus.

Incidentally, in the conventional remote panel system, the operation screen displayed on the terminal device can be changed in any size by a user operation. On the other hand, in the conventional method for creating the RPA script data, the position of the operation target to be operated is designated by coordinates of the coordinate system of the desktop screen.

SUMMARY

As described above, when the position of the operation target to be operated is designated by the coordinates of the coordinate system of the desktop screen, there is a problem that, in a case where the size of the operation screen is changed, it is impossible to give an appropriate instruction of the position of the operation target to be operated after the size is changed. A first object of the present disclosure is to provide a method for creating RPA script data that can give an appropriate instruction of an operation position after a size of an operation screen is changed in a case where the size of the operation screen is changed.

A second object is to provide a method for executing RPA script data that enables appropriate calculation of coordinates of a position to be operated by RPA using the RPA script data created by the creation method described above.

A third object is to provide a terminal device that can execute the creating method described above.

A fourth object is to provide an image processing apparatus capable of calculating coordinates of a position to be operated by RPA using the RPA script data created by the creation method described above.

A fifth object is to provide a data structure of the RPA script data that can be used in the creation method described above.

A sixth object is to provide a program capable of causing a computer to calculate coordinates of a position to be operated by RPA using the RPA script data created by the creation method described above.

To achieve at least one of the abovementioned objects, according to an aspect of the present invention, a method for creating robotic process automation (RPA) script data to perform an operation in a terminal device that displays an operation screen for an image processing apparatus on a host terminal and receives the operation by the RPA, reflecting one aspect of the present invention comprises: detecting a position of an operation target displayed on the operation screen and selected by an operator; and normalizing the detected position of the operation target on a basis of a size of the operation screen, generating position information indicating the normalized position, and describing the position information in the RPA script data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

[1] System Configuration

Figure 1:
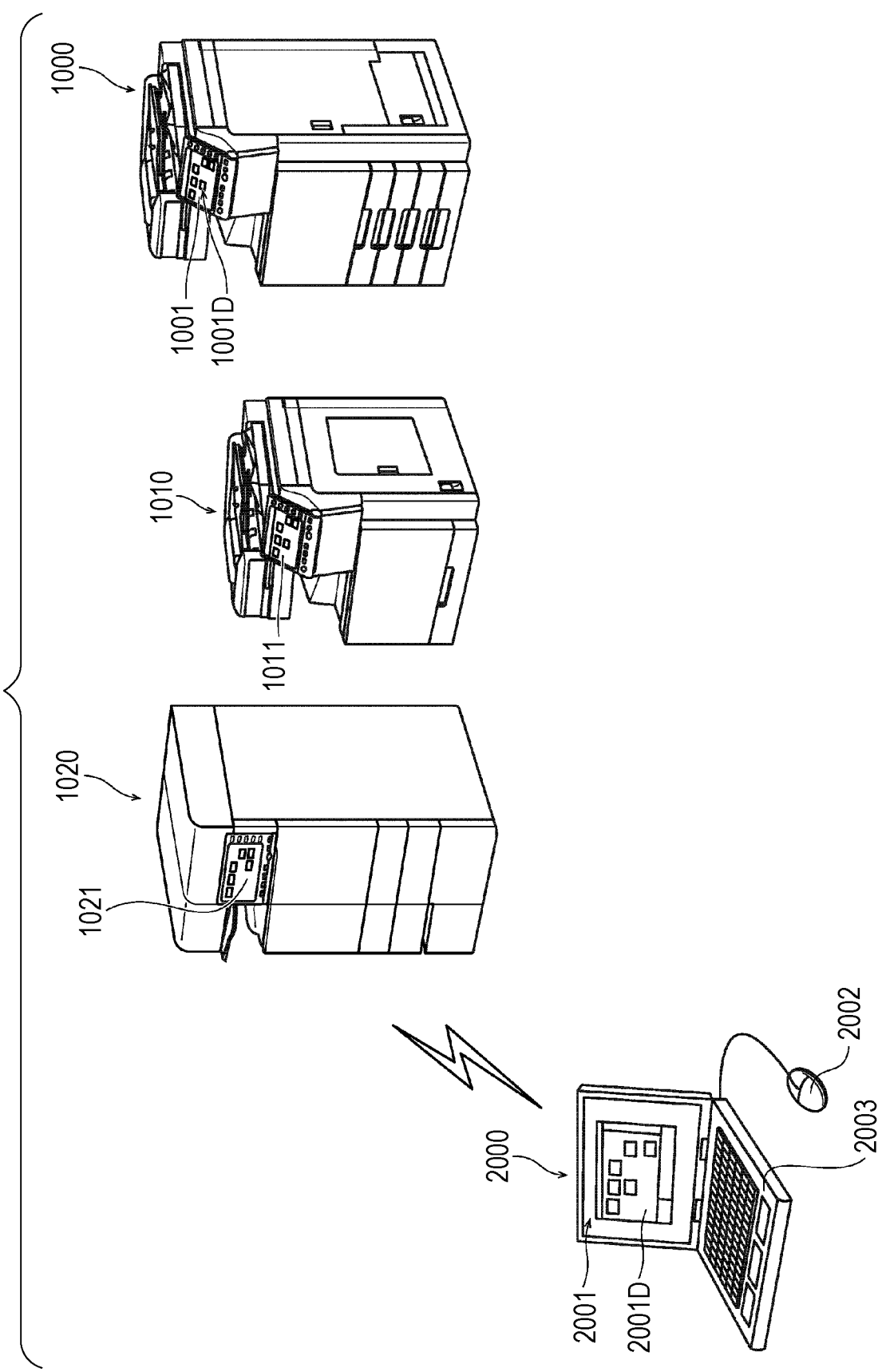
FIG. 1 illustrates a configuration of an RPA system.

Hereinafter, one or more embodiments of an image processing apparatus and a terminal device according to the present invention will be described with reference to the drawings. However, the scope of the invention is not limited to the disclosed embodiments. FIG. 1 illustrates a configuration of an RPA system according to the present embodiment. As illustrated in the drawing, the RPA system includes image processing apparatuses 1000, 1010, and 1020 and a terminal device 2000. Robotic Process Automation (RPA) is a program for automating an operation for a desktop screen, and in the RPA system, data (RPA script data) indicating a series of procedures to be executed by RPA is created by the terminal device 2000, stored in a storage of the terminal device 2000, and made available for use.

The image processing apparatus 1000 is a multi-function peripheral (MFP) capable of forming an image on A3 paper, the image processing apparatus 1010 is a single function peripheral (SFP) capable of forming an image on A4 paper, and the image processing apparatus 1020 is an all in one (AIO) machine.

A touch panel display 1001 of the image processing apparatus 1000 is, for example, 10 inches, and touch panel displays 1011 and 1021 of the image processing apparatuses 1010 and 1020 are, for example, eight inches, and the sizes of the touch panels are different from each other. In addition, it is assumed that screen resolutions are different.

Note that, in the present embodiment, the screen resolution of each of the touch panel displays 1001, 1011, and 1021 of each image processing apparatus is represented by a set of the number of horizontal pixels and the number of vertical pixels of the entire screen. This is to simplify calculation of in-window coordinates to be described later. Hereinafter, a case where the image processing apparatus 1000 is operated by the terminal device 2000 will be described.

The terminal device 2000 is a device used by a user who operates the image processing apparatus 1000 together with the image processing apparatus 1000, displays a screen (remote panel) 2001D that is the same as a screen 1001D displayed on the touch panel display 1001 of the image processing apparatus 1000 on the LCD 2001, receives an operation on the remote panel from the user, and commands the image processing apparatus 1000 to perform processing according to the operation.

[2] Hardware Configuration of Terminal Device 2000 and Image Processing Apparatus 1000

Figure 2:
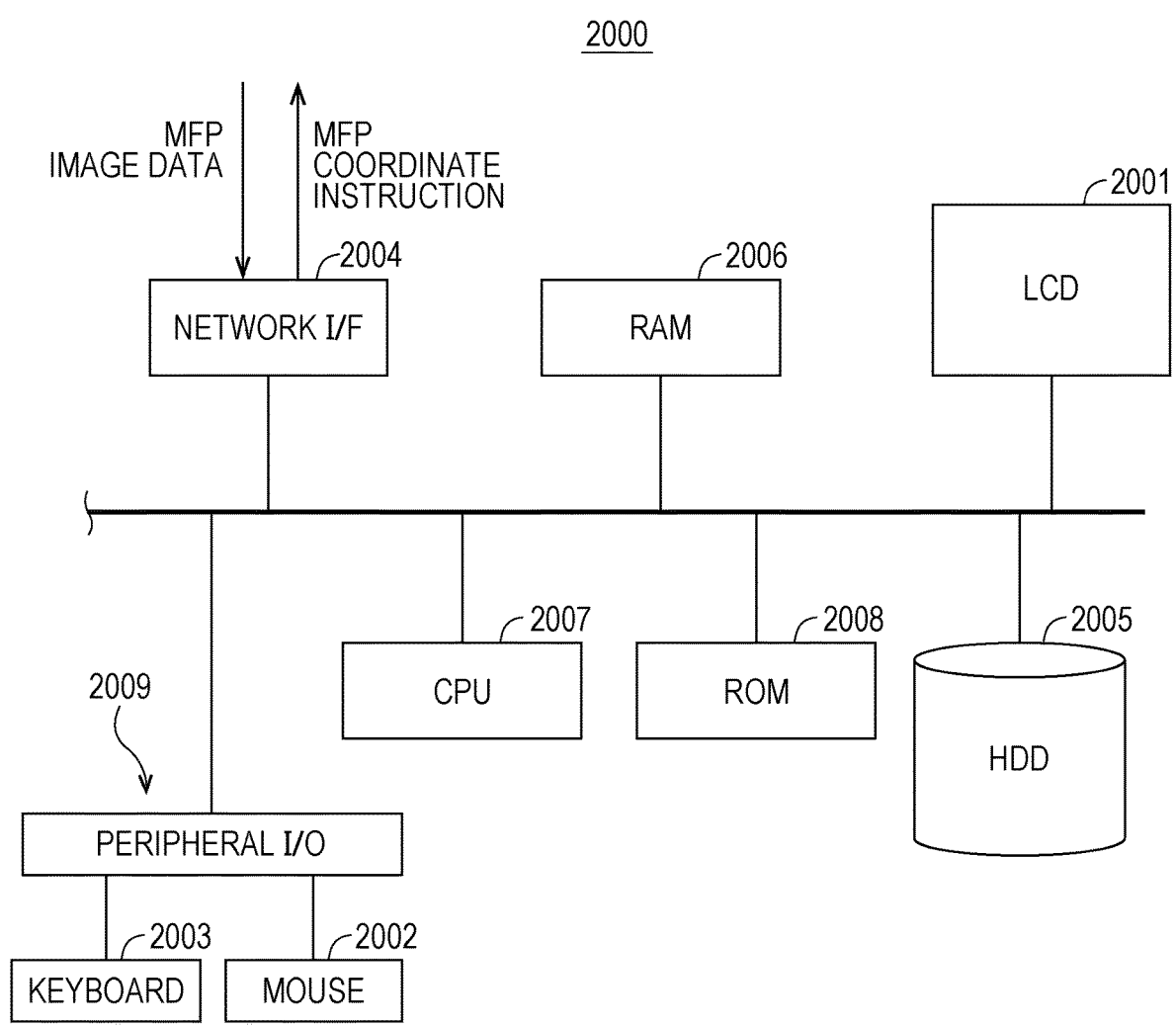
FIG. 2 illustrates a hardware configuration of a terminal device.

FIG. 2 illustrates a hardware configuration of the terminal device 2000.

As illustrated in the drawing, the terminal device 2000 includes an LCD 2001 that provides an interactive operation environment to the user, a mouse 2002 that is an example of a pointing device, a keyboard 2003, a network I/F 2004, an HDD 2005 in which various programs are installed, a RAM 2006 on which necessary programs among the programs installed in the HDD 2005 are loaded, a CPU 2007 that executes the programs loaded in the RAM, a flash ROM 2008 for storing necessary settings when executing the programs, and a peripheral I/O 2009 for receiving an input operation on the mouse 2002 and the keyboard 2003.

The network I/F 2004 is a communication module that performs LAN connection and WAN connection. The communication module includes a near field communication module such as Bluetooth (registered trademark), Wi-Fi, EnOcean, or specified low power (Wi-SUN), and executes transmission and reception of operation information and image data via radio. The RAM 2006 includes a VRAM, and pixel data indicating pixels of one screen on which the LCD 2001 performs display is stored therein.

Figure 3:
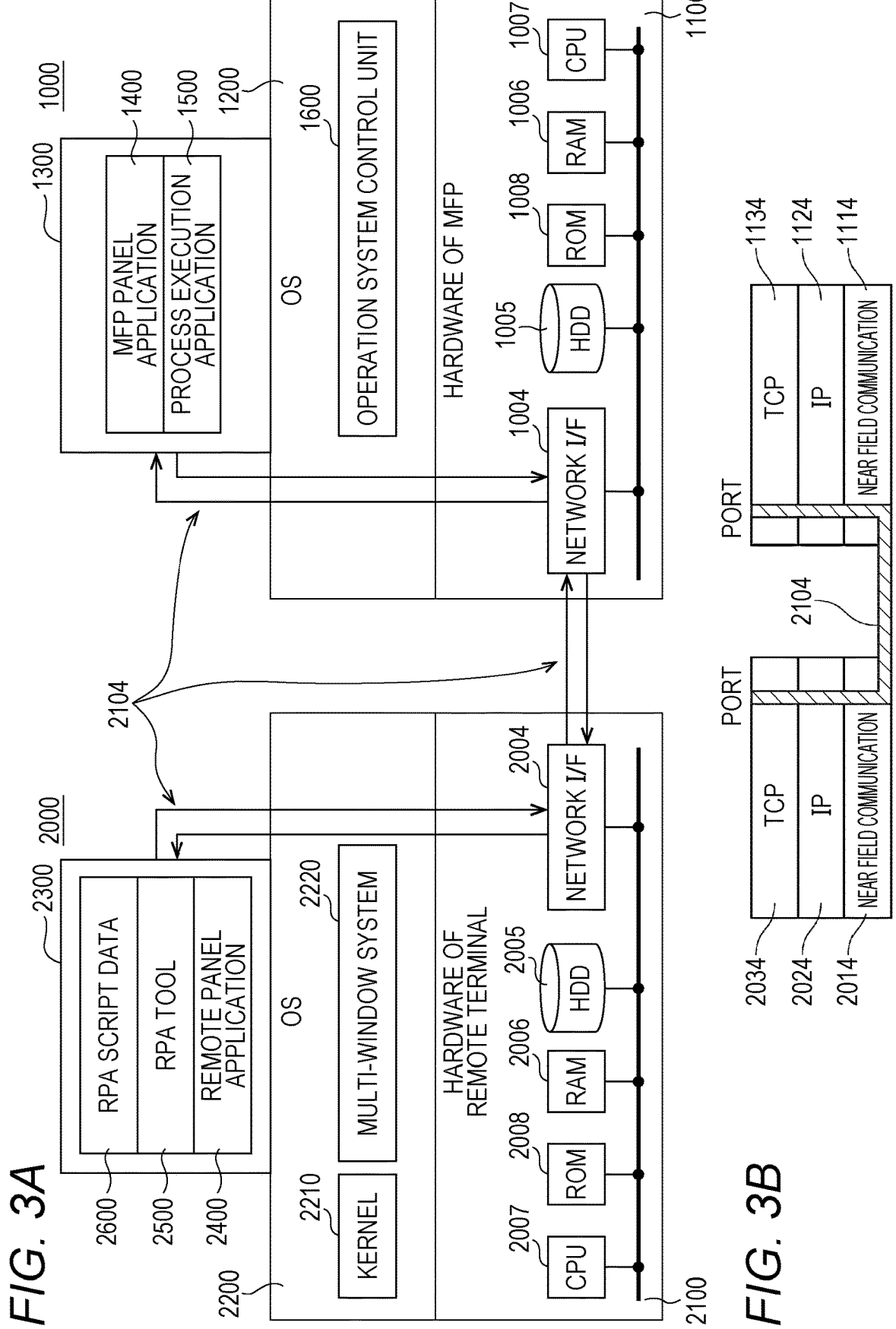
FIG. 3A illustrates a software stack of programs installed in an HDD of the terminal device and an HDD of an image processing apparatus.
FIG. 3B illustrates a protocol stack of communication between the terminal device and the image processing apparatus.

The image processing apparatus 1000 also has a hardware configuration (in addition to the touch panel display 1001, the network I/F 1004, the HDD 1005, the RAM 1006, the CPU 1007, and the ROM 1008 illustrated in FIG. 3A) similar to that of the terminal device 2000, and a necessary program is installed in the HDD. An operation on the touch panel display 1001 is performed using a plurality of pieces of page data stored in the HDD 1005. Each of the plurality of pieces of page data has a hierarchical menu structure and includes a tag defining an operation target. Each tag indicates a file path (including a directory name and a file name) of a file storing graphics data representing an operation target, coordinate information indicating arrangement coordinates of the operation target, and a script to be executed when an operation on the operation target is determined. Some scripts define a link to other page data, and some scripts define setting processing related to image formation.

On the other hand, an operation screen displayed on the LCD 2001 is a bitmap representing the same operation screen as the touch panel display 1001, and the content of the operation screen is represented by additive mixing of red pixels (R), green pixels (G), and blue pixels (B). Since the bitmap is used, the state of a GUI member cannot be changed, and the page cannot be switched. Therefore, in order to instruct the image processing apparatus 1000 to perform control, it is necessary to receive a click operation on the remote panel (operation screen for the operation screen) of the bitmap displayed on the LCD 2001, transmit operation information indicating the coordinates of the clicked position to the image processing apparatus 1000, and cause the image processing apparatus 1000 to perform the same processing as that when the touch panel display 1001 is touched at the coordinates.

The program stored in the HDD 2005 includes a program indicating a series of operations by the RPA. The program indicating a series of operations by the RPA includes a code (script for the RPA in the present embodiment) incorporated in the page data. The page data in which the RPA script is incorporated is referred to as RPA script data.

[3] Software Stack

FIG. 3A illustrates a software stack of programs installed in the HDD 2005 of the terminal device 2000 and HDD 1005 of image processing apparatus 1000. The software stack of the terminal device 2000 has a control hierarchy in which an operating system (OS) 2200 is arranged on hardware 2100 of the terminal device 2000, and an application 2300 is arranged thereon.

As in the terminal device 2000, the software stack of the image processing apparatus 1000 has a control hierarchy in which an OS 1200 is arranged on the hardware 1100 of the image processing apparatus 1000, and an application 1300 is arranged thereon.

The OS 2200 of the terminal device 2000 and the OS 1200 of the image processing apparatus 1000 execute data communication by a protocol stack via the network I/Fs 2004 and 1004. The applications 2300 and 1300 establish a TCP connection 2104 by the TCP protocols 1134 and 2034, the IP protocols 1124 and 2024, and the near field communications 1114 and 2014 illustrated in FIG. 3B, and transmit and receive the HTTP message through the TCP connection 2104.

The TCP connection 2104 is established in such a manner that the terminal device 2000 is on the host side, the application 2300 designates the port number of the TCP port of the counterpart application 1300 and its own port number to issue a connection request, and the application 1300 confirms that the port requested from the connection side is waiting for connection and returns a response. The application 2300 operating on the terminal device 2000 and the application 1300 operating on the image processing apparatus 1000 use the TCP connection 2104 for transmission and reception of image data and operation information using the port number designated by the host side at the time of connection.

(3-2) The software stack application 1300 of the image processing apparatus 1000 includes an MFP panel application 1400 and a process execution application 1500. Further, as a component for the remote operation mode, the OS 1200 includes an operation system control unit 1600.

The panel application 1400 reads a plurality of pieces of page data stored in the HDD 1005 and provides an operation screen for display. In addition, transition of the operation screen is performed according to an operation input from the touch panel display 1001. The operation input from the touch panel display 1001 is operation information indicating which position on the touch panel display 1001 has been operated, and indicates coordinates in a panel coordinate system of the touch panel display 1001 and an operation (type of touch or drag) performed on the coordinates. By determining the operation target at the coordinates in the page data corresponding to the current operation screen, the script corresponding to the operation target is executed. When the script corresponding to the determined operation target is a link script defining a link to another page data, the operation screen is switched to an operation screen corresponding to another page data. When the script corresponding to the determined operation target is a panel setting or a job setting related to image formation, the panel setting and the job setting are executed.

The process execution application 1500 executes panel setting according to an operation input made to the MFP panel application 1400, and performs setting and execution of a job or when the image processing apparatus 1000 is installed in an office.

The operation system control unit 1600 switches the operation system in the remote operation mode. Specifically, in the remote operation mode, instead of the operation input from the panel display 1001, the operation input via the TCP connection 2104 with the terminal device 2000 is enabled, and the bitmap of the operation screen drawn by the page data is output to the terminal device 2000 via the TCP connection. When the operation input from the TCP connection 2104 is enabled instead of the operation input from the touch panel display 1001, the operation screen in the image processing apparatus 1000 is switched by the operation input from the terminal device 2000.

(3-3) Software Stack of Terminal Device 2000

Figure 4:
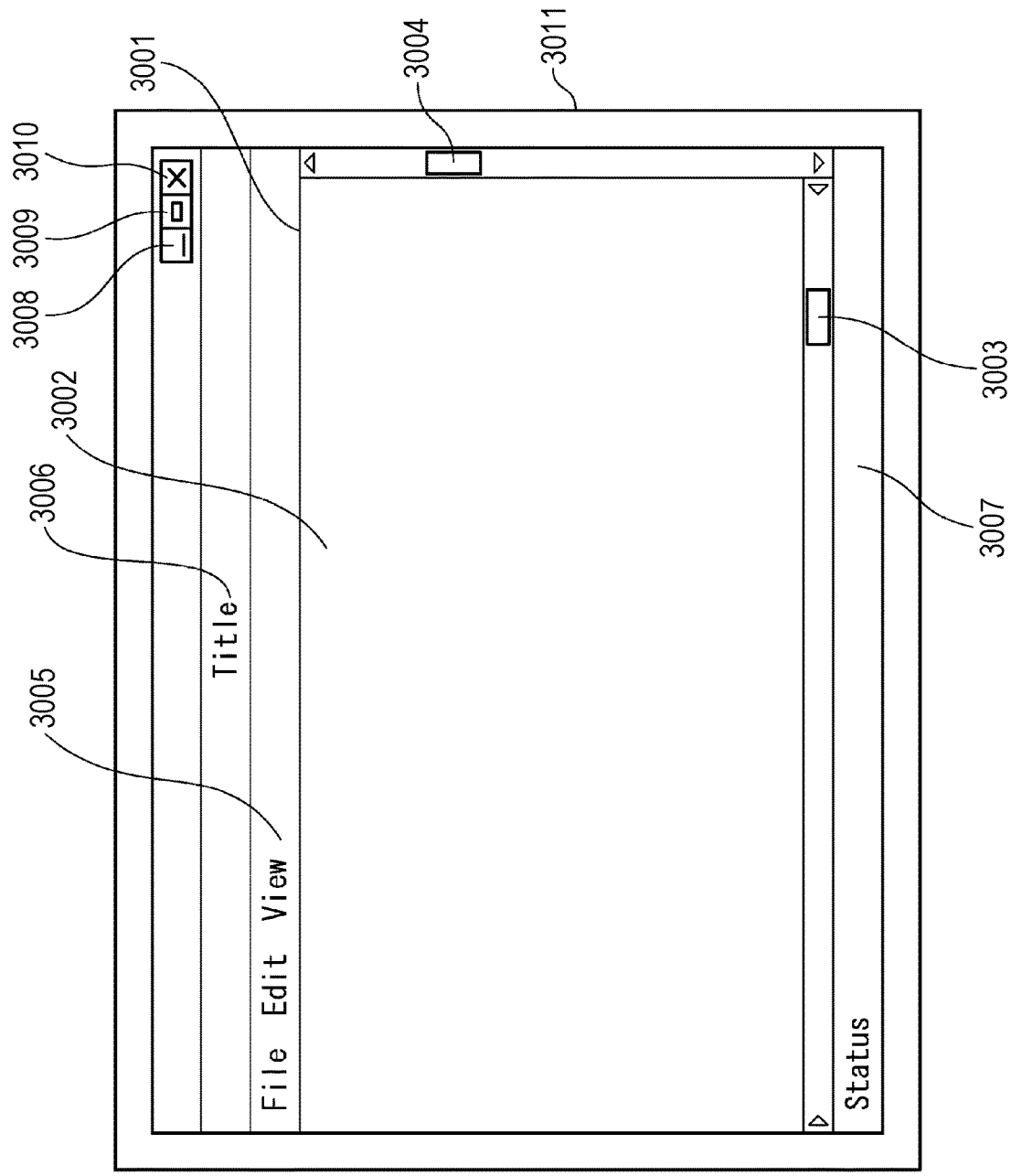
FIG. 4 illustrates an example of a window assigned to each application by the multi-window system.

The OS 2200 includes a kernel 2210 and a multi-window system 2220. The kernel 2210 allocates a plurality of partial areas of the RAM 2006 to each application, starts a plurality of applications, and monitors the operation of each application. The multi-window system 2220 provides the user with an interactive operation environment by assigning a window and providing the window for display to each of the plurality of applications. The window is a unit of a display area assigned to each application by the multi-window system 2220, and as illustrated in FIG. 4, an application screen 3002 (a screen indicating contents drawn by the application) can be displayed in a mode surrounded by a display frame 3001. Since the entire application screen is displayed to the full display frame, the display frame 3001 is the entire operation screen (remote panel) displayed on the terminal device 2000.

Various GUI components are arranged around the display frame 3001. Such GUI components include a horizontal scroll bar 3003 that receives horizontal scrolling, a vertical scroll bar 3004 that receives vertical scrolling, a menu bar 3005 that enables pull-down (drawing) of various menus, a title bar 3006 indicating the name of an application, a status bar 3007 indicating the state of the application, a minimization button 3008, a full-screen instruction button 3009, and a close button 3010. The user can resize the application screen by dragging a boundary 3011 of the window. In addition, it is possible to move to a desired position. A state in which the window receives an operation on these GUI members or the application screen is referred to as active. When a window is indicated by a cursor while the window is displayed, the window becomes active. The multi-window system 2220 performs window display of an operation screen corresponding to the image processing apparatus 1000 by drawing the bitmap received via the TCP connection 2104 in the VRAM in the RAM 2006.

Representative examples of the application 2300 managed by the kernel 2210 include a remote panel application 2400 and an RPA tool 2500 illustrated in FIG. 3A. The remote panel application 2400 is one of the applications 2300, and performs window display of the bitmap output from the image processing apparatus 1000. Since it is a bitmap, when the resizing operation is performed by clicking the boundary of the window, the size of the bitmap changes according to the resizing operation, and the number of horizontal pixels and the number of vertical pixels change.

The remote panel application 2400 outputs the operation information to the panel application 1400 in a state where the operation input from the terminal device 2000 is enabled in the image processing apparatus 1000, and causes the panel application 1400 to perform screen transition according to the operation input from the terminal device 2000.

The RPA tool 2500 can register operations to be performed by the RPA and perform the registered RPA operations. The registration is performed by generating RPA script data 2600 indicating a series of operations to be performed by the RPA and writing the RPA script data in the HDD 2005. In addition, the registered RPA operation is executed by reading the RPA script data 2600 indicating the registered operation from the HDD 2005 and causing the RPA tool 2500 to execute the RPA script data. In creating the RPA script data 2600, a remote panel that is a bitmap of an operation screen of the image processing apparatus 1000 is displayed on a terminal device, a user operation on the remote panel is received, a position where an input such as a touch is made by the user operation is detected in units of pixels to obtain coordinate information, and a script is created from the detected coordinate information. Script creation from such coordinate information is repeated to obtain the RPA script data 2600. On the other hand, in executing the RPA script data, the coordinate information of each script constituting each procedure of the RPA script data 2600 is transmitted to the remote panel application 2400, and remote control based on the coordinate information is executed by the remote panel application.

[4] Configuration of RPA Script Data

By such calculation, the position to be operated by the RPA is expressed in the range of zero to one with the upper left vertex of the window as (0, 0) and the lower right of the window as (1, 1). Note that, as described above, since there is no information element such as the tag to be an operation target in the bitmap, the coordinates in the RPA script data merely designate any pixel of the bitmap.

Figure 5A:
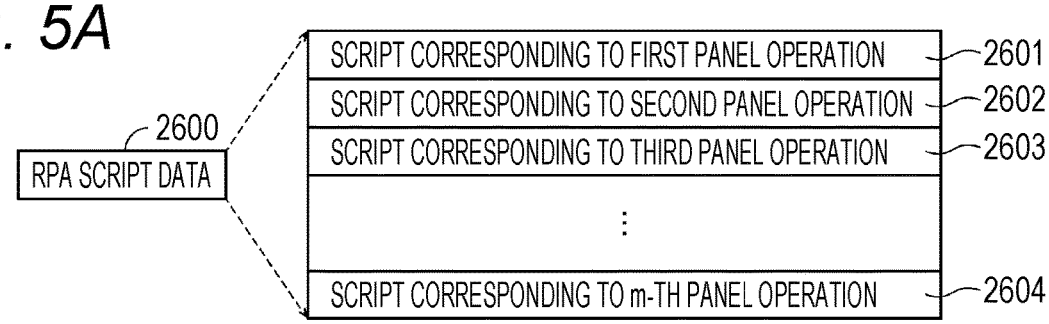
FIG. 5A illustrates a configuration of RPA script data.

FIG. 5A illustrates a data structure of the RPA script data 2600. As illustrated in the drawing, the RPA script data 2600 includes a field 2601 in which a script representing a first procedure is described, a field 2602 in which a script representing a second procedure is described, a field 2603 in which a script representing a third procedure is described, . . . a field 2604 in which a script representing a m-th procedure is described.

(4-1) RPA Function that can be used to Describe RPA Script Data

In a case where the RPA script data described above is executed by the RPA tool 2500, for example, PYAutoGUI can be used to describe these procedures. PYAutoGUI is a program library that provides functions for RPA. Among the RPA functions provided by PYAutoGUI, the following functions define an operation for the coordinate system of the desktop screen.

click (x, y, button, clicks=right/left, interval)

At the coordinates (x, y) designated by the argument, the operation event designated by the argument "clicks" is generated by the time interval designated by the argument interval.

Figure 6:
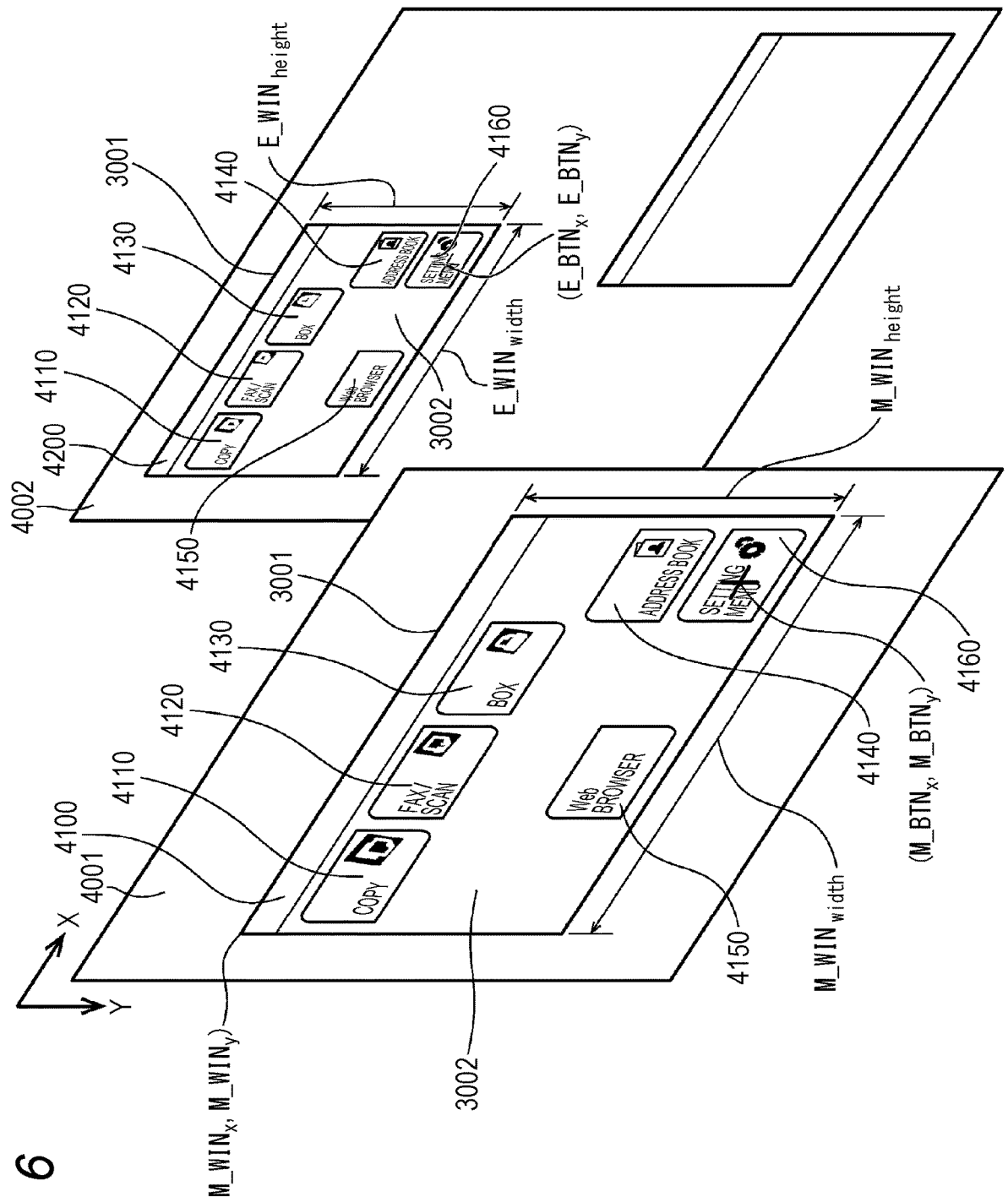
FIG. 6 illustrates a desktop screen for creating RPA script data and a desktop screen for executing the RPA script data.

The coordinates handled by the above function are expressed by coordinates in a desktop screen coordinate system in which upper left points of screens of desktop screens 4001 and 4002 in the terminal device 2000 of FIG. 6 are the origins, a rightward direction on the screen is an X-axis direction, and a downward direction on the screen is a Y-axis direction. On the other hand, the remote panel is arranged and displayed inside the display frame 3001 of the window by the multi-window system 2220. The location in the window is expressed by coordinates in an in-window coordinate system in which an upper left point of an application area (display frame 3001) illustrated in FIG. 4 is the origin, the rightward direction on the screen is the X-axis direction, and the downward direction on the screen is the Y-axis direction.

(4-2) Difference in Window Display Size

The display size of the window may be different between at the time of creating the RPA script data and at the time of executing the RPA script data. In the present embodiment, a window display size is represented by a set of the number of horizontal pixels and the number of vertical pixels of the application screen 3002 in the display frame of the window.

The desktop screen 4001 is a screen for creating the RPA script data, and the desktop screen 4002 is a screen for executing the RPA script data. On the desktop screen 4001 at the time of creation, a window 4100 in which a remote panel is arranged is arranged. The window 4100 is set to be considerably large, and the number of horizontal pixels and the number of vertical pixels thereof are set to variables $M\_WIN_{width}$ and $M\_WIN_{height}$.

Further, buttons 4110, 4120, 4130, 4140, 4150, and 4160 for operating the image processing apparatus 1000 are arranged. In the remote panel, a location operated by the user (in FIG. 6, the center position of the button 4160) is clearly indicated in variables $M\_BTN_x$ and $M\_BTN_y$.

On the other hand, since a plurality of windows is simultaneously displayed on the desktop screen 4002 at the time of execution, the size of a window 4200 activated by arranging the remote panel is small. The number of horizontal pixels and the number of vertical pixels of the window 4200 activated when the RPA script data is executed are set to variables $E\_WIN_{width}$ and $E\_WIN_{height}$.

Figure 5B:
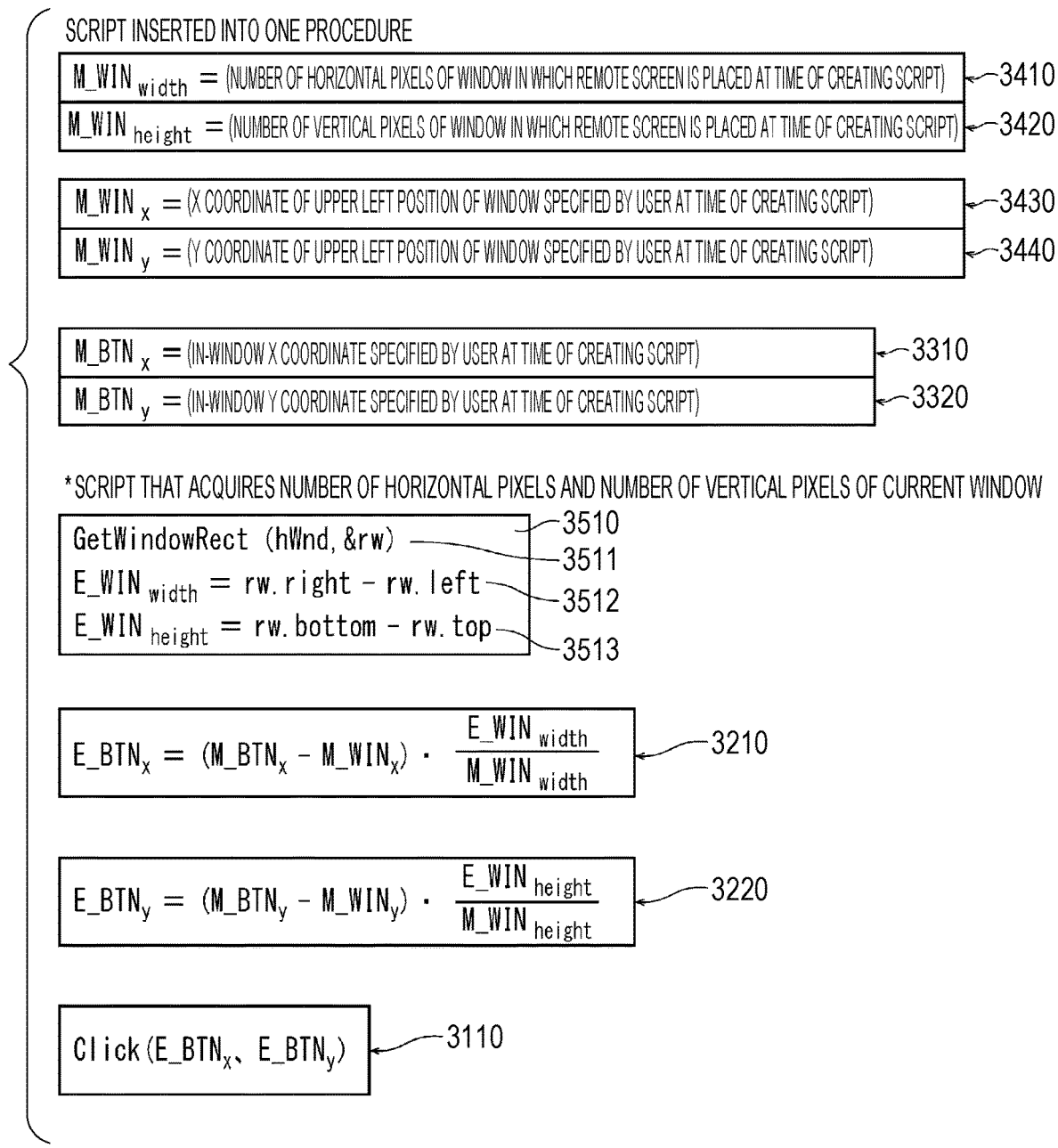
FIG. 5B illustrates an example of a script that normalizes and indicates in-window coordinates of a touched position and recalculates the in-window coordinates.

In a case where the window size at the time of execution is smaller than that at the time of creation, the positional relationship of the buttons 4110, 4120, 4130, 4140, 4150, and 4160 is the same or almost the same regardless of the size, but since the distance from the upper left point of the window to each button changes, the area occupied by the buttons also changes. In the remote panel at the time of execution, the location to be operated is clearly indicated by variables $E\_BTN_x$ and $E\_BTN_y$. A major feature of the RPA script data 2600 is that, upon registration of RPA, the location to be operated clearly indicated in the variables $E\_BTN_x$ and $E\_BTN_y$ is normalized according to the size of the operation screen of the window display. FIG. 5B illustrates an example of a script that normalizes and indicates the coordinates of the touched position.

In FIG. 5B, a script 3110 described at the bottom (corresponding to a first code of the invention of the program) uses the variables $E\_BTN_x$ and $E\_BTN_y$ illustrated in FIG. 6 as arguments and instructs the RPA tool 2500 to generate a click event at the position designated by these arguments.

Scripts 3210 and 3220 define recalculation calculation formulas for setting values to the variables $E\_BTN_x$ and $E\_BTN_y$ as arguments of the script 3110. The script 3210 (corresponding to a second code of the invention of the program) causes the RPA tool 2500 to execute recalculation of setting a value obtained by multiplying the difference between the variable M_BTNx and the variable M_WINx by the ratio between $M\_WIN_{width}$ and $E\_WIN_{width}$ to the variable E_BTNx.

The script 3220 (corresponding to the second code of the invention of the program similarly to the script 3210) causes the RPA tool 2500 to execute calculation of setting a value obtained by multiplying the difference between the variable M_BTNy and the variable M_WINy by the ratio between $M\_WIN_{height}$ and $E\_WIN_{height}$ to the variable E_BTNy. Among the operators to be operated in the scripts 3210 and 3220, the values of $E\_WIN_{width}$ and $E\_WIN_{height}$ are determined at the time of executing the RPA script data.

The values of the remaining variables are determined at the time of creating the RPA script data. Scripts 3310 and 3320 set immediate values to the variables M_BTNx and $M\_BTN_y$ used in the scripts 3210 and 3220, respectively. Here, the immediate value indicates the X coordinate and the Y coordinate in the window of the operated location when the RPA script data is created.

Scripts 3410 and 3420 set immediate values to the variables $M\_WIN_{width}$ and $M\_WIN_{height}$ used in the calculation formulas of the scripts 3210 and 3220. Here, the immediate value is the number of horizontal pixels and the number of vertical pixels of the window including the operated remote panel when the RPA script data is created.

Scripts 3430 and 3440 set immediate values to the variables M_WIN$_x$ and M_WIN$_y$ used in the calculation formulas of the scripts 3210 and 3220. Here, the immediate value is the upper left X coordinate and the upper left Y coordinate of the window including the operated remote panel when the RPA script data is created.

Scripts 3511 to 3513 set the variables E_WIN$_{width}$ and E_WIN$_{height}$ used in the scripts 3210 and 3220 using functions that control the multi-window system 2220.

The script 3511 is a function call script of contents calling a GetWindowRect function using the variable hWnd and the structure variable rw as arguments. The GetWindowRect function is a function that provides information regarding a window in Windows (registered trademark) of Micro Soft, and by calling the function, a return value is set to member variables rw.right, rw.left, rw.bottom, and rw.top of the structure variable rw.

An X coordinate of a lower right vertex of the window is set to rw.right, an X coordinate of an upper left vertex of the window is set to rw.left, a Y coordinate of a lower right vertex of the window is set to rw.bottom, and a Y coordinate of an upper left vertex of the window is set to rw.top.

The operation scripts 3512 and 3513 are calculations of the number of window horizontal pixels and the number of vertical pixels using these member variables. That is, the operation script 3512 sets a difference between the member variables rw.right and rw.left as E_WIN$_{width}$, and the operation script 3513 sets a difference between the member variables rw.top and rw.bottom as E_WIN$_{height}$. Note that, in the present embodiment, the number of window horizontal pixels and the number of vertical pixels are calculated using a function supplied by Windows (registered trademark) of MicroSoft, but the present invention is not limited thereto. The number of horizontal pixels and the number of vertical pixels may be calculated using a function supplied by a multi-window system of another operating system.

In the RPA script data, before the script 3110 that causes the RPA tool 2500 to move a cursor, there are the scripts 3210 and 3220 that calculate variables serving as arguments and the scripts 3310, 3320, 3410, 3420, 3430, and 3440 that set immediate values, the scripts 3511, 3512, and 3513 that obtain the number of horizontal pixels and the number of vertical pixels of an active window are arranged, and at the time of creating the RPA script data, and since the coordinates of the position touched in the window are in a mode normalized by the number of horizontal pixels and the number of vertical pixels of the window, coordinates to be instructed to the RPA tool 2500 can be calculated if the values of E_WIN$_{height}$ and E_WIN$_{width}$ are determined at the time of executing the RPA script data.

[5] Processing Procedure of RPA Tool 2500 and Remote Panel Application 2400

(5-1) Opening of Window by RPA Tool 2500

Figure 7:
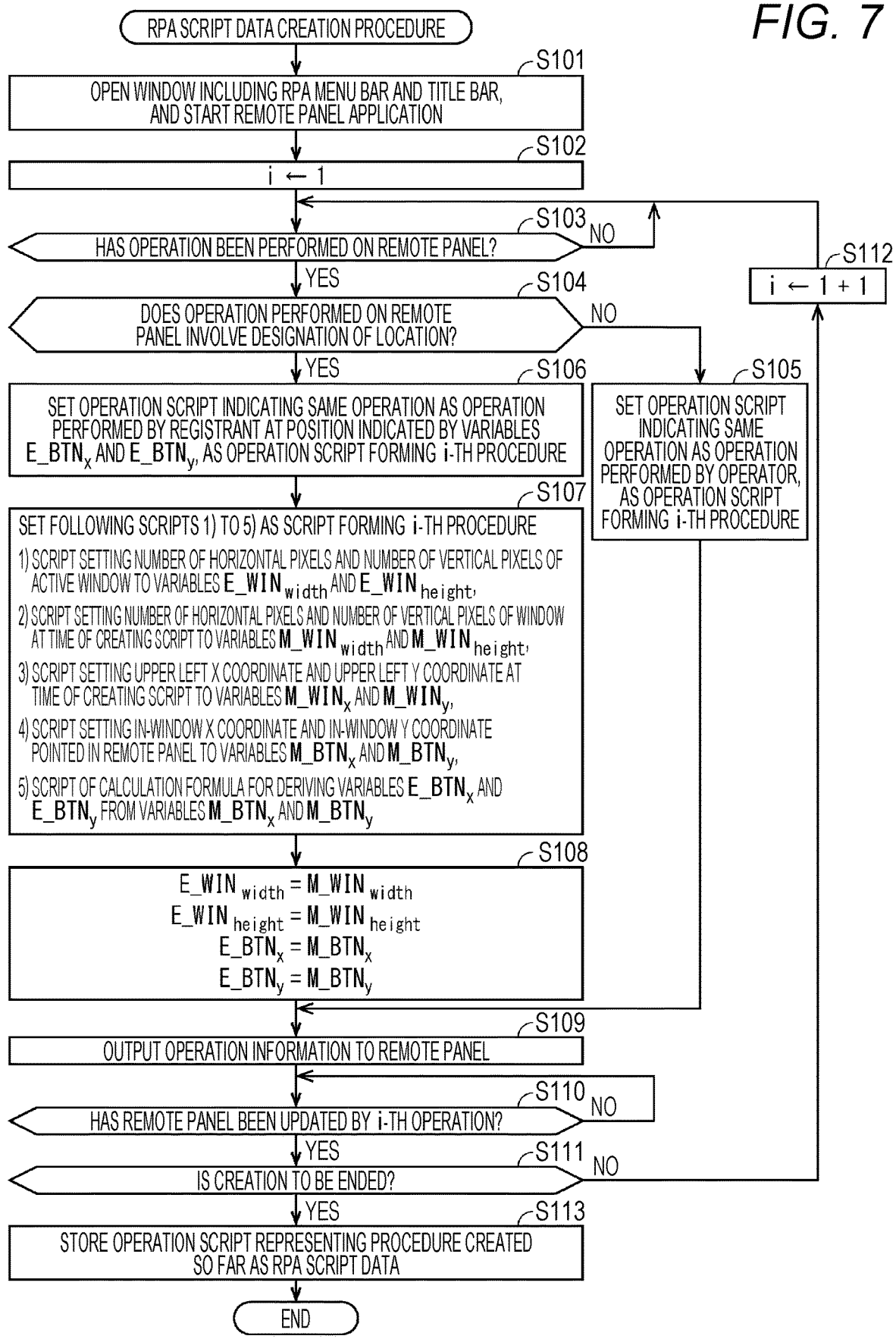
FIG. 7 is a flowchart illustrating an RPA script data creation procedure by an RPA tool.
Figure 8:
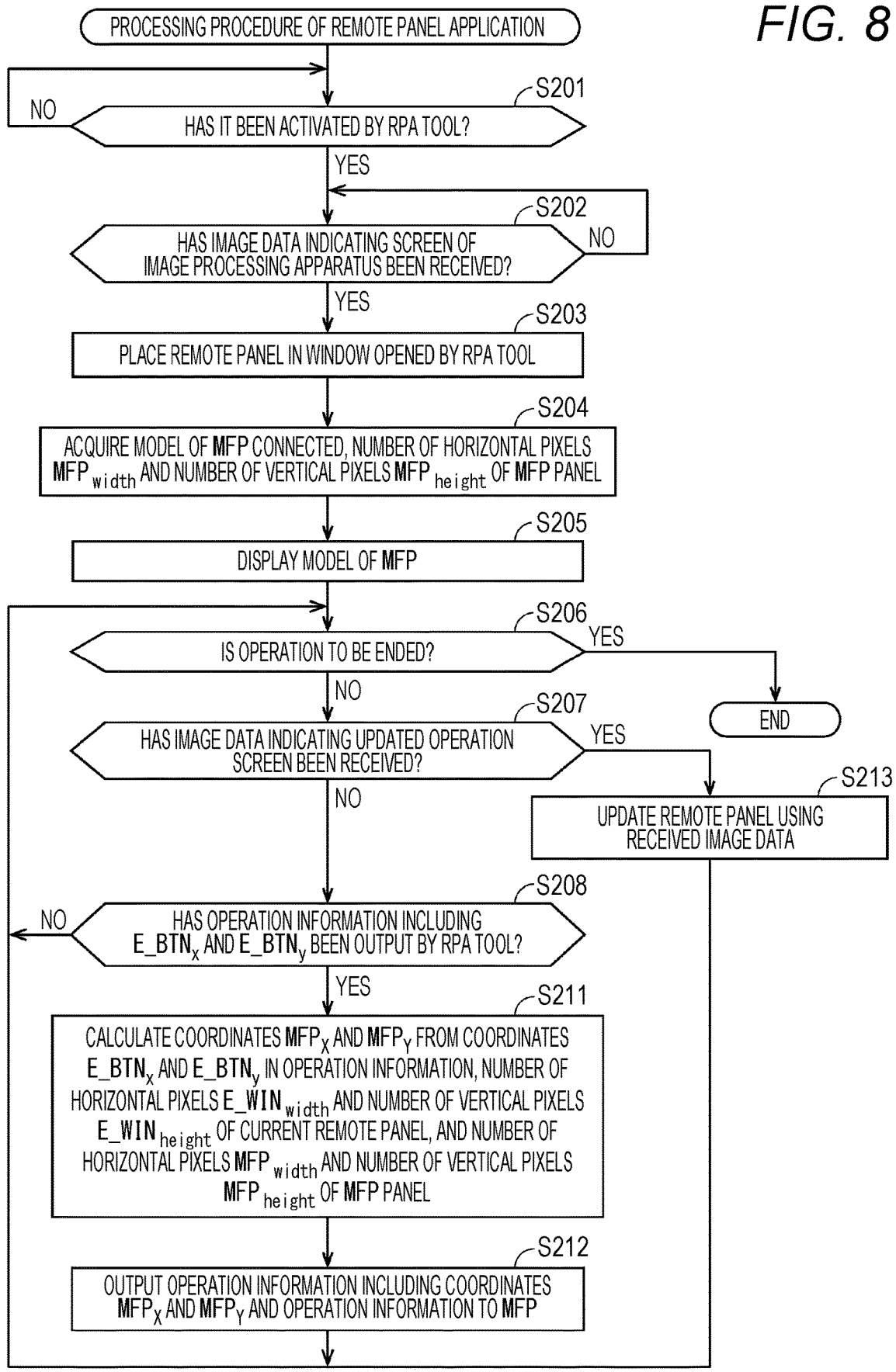
FIG. 8 is a flowchart illustrating a processing procedure of a remote panel application.
Figure 10:
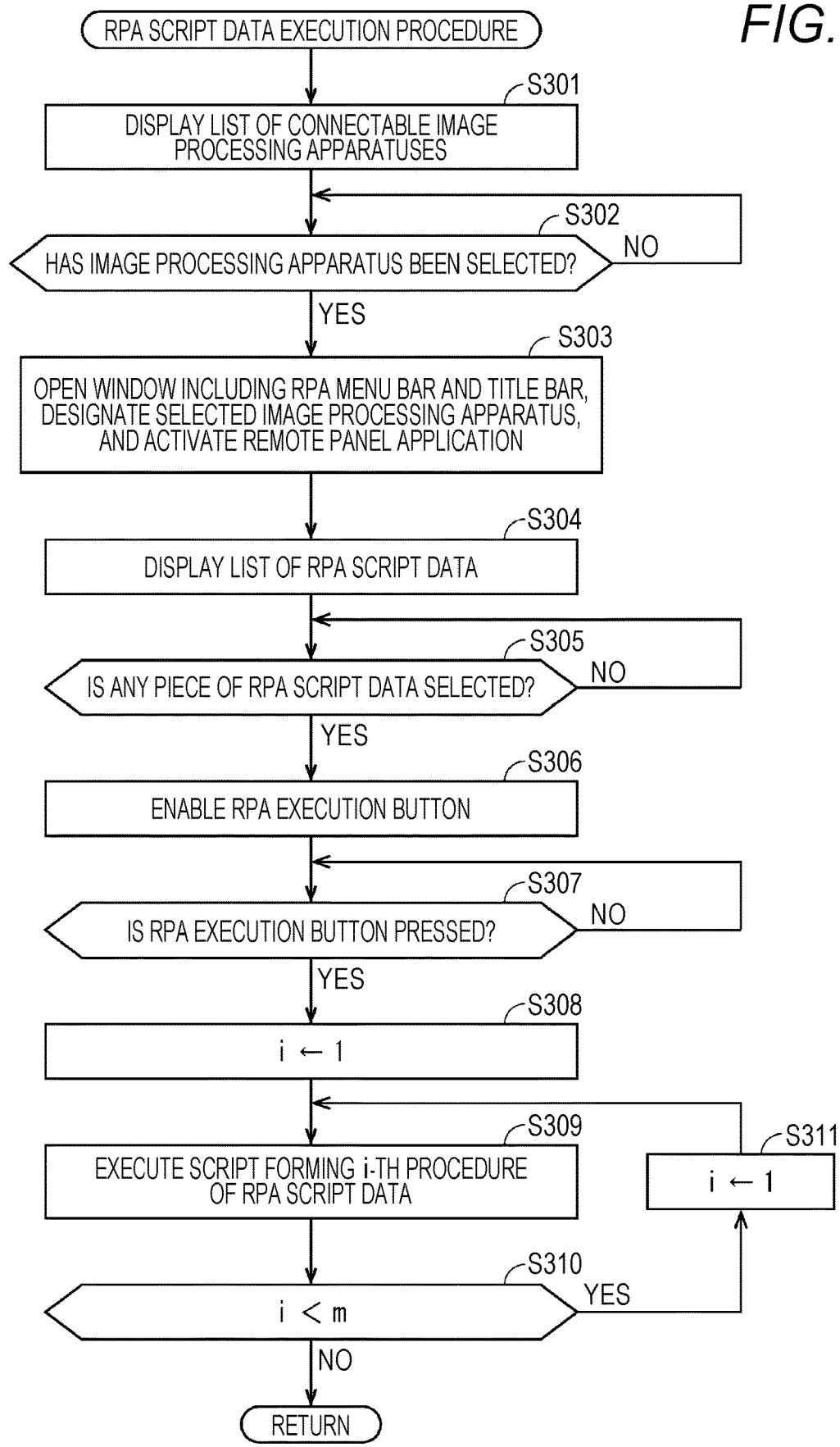
FIG. 10 is a flowchart illustrating an RPA script data execution procedure.

The RPA tool 2500 includes a code string instructing the CPU 2007 to execute the processing procedure illustrated in the flowcharts of FIGS. 7 and 10. The remote panel application 2400 includes a code string instructing the CPU 2007 to execute the processing procedure illustrated in the flowchart of FIG. 8. FIG. 7 is a flowchart illustrating a processing procedure of the RPA tool 2500, and FIG. 8 is a flowchart illustrating a processing procedure of the remote panel application 2400. In FIG. 7, i is a variable indicating each of a plurality of procedures to be indicated in the RPA script data, and takes a value from 1 to m.

In step S101 of FIG. 7, a window including an RPA menu bar and a title bar is opened, and the remote panel application 2400 is started.

(5-2) Display and Update of Remote Panel by Remote Panel Application 2400

Step S201 in FIG. 8 is a determination as to whether it has been started by the RPA tool 2500, and in a case where it has been started by the RPA tool 2500 (Yes in step S201), it is determined whether image data indicating a screen of the image processing apparatus 1000 has been received (step S202). When the image data has been received, the remote panel is placed in the window opened by the RPA tool 2500 (step S203).

Figure 9A:
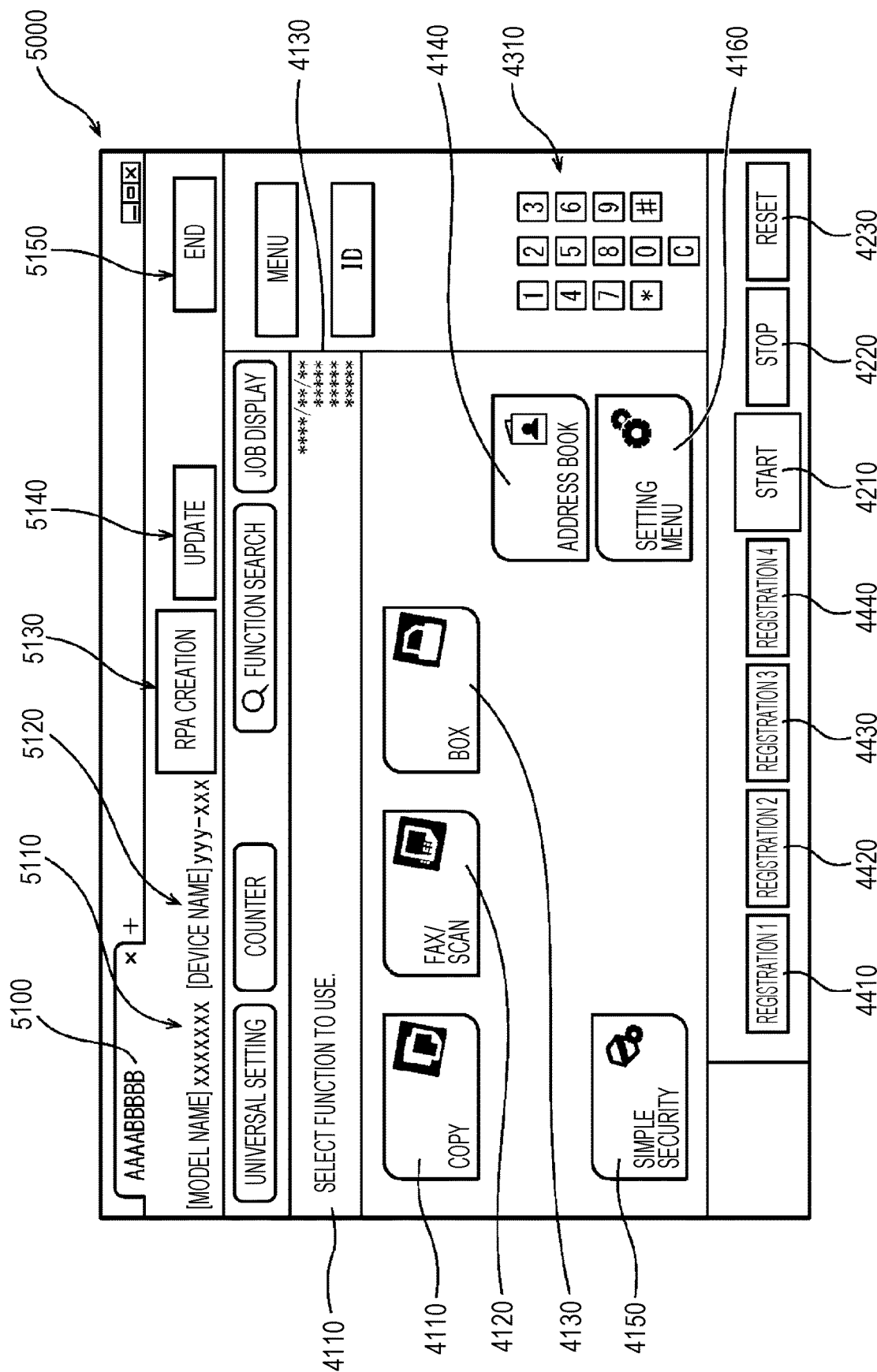
FIG. 9A illustrates an example of a remote panel displayed on an LCD in step S203.

FIG. 9A illustrates an example of the remote panel displayed on the LCD 2001 in step S203. As illustrated in the drawing, the remote panel of the image processing apparatus is arranged in a display area of a window 5000 by arranging a tab 5100 on the window. The tab 5100 includes a model name display 5110, a device name display 5120, an RPA creation/execution button 5130 for receiving creation and execution of RPA script data, an update button 5140 for receiving update operation of RPA script data, and an end button 5150.

At the lower end of the window 5000, buttons 4410, 4420, 4430, and 4440 corresponding to registration keys of the image processing apparatus 1000, a start button 4210 for instructing job start, a stop button 4220 for stopping the job, and a reset button 4230 for resetting panel settings are arranged.

The remote panel in FIG. 9A is a top screen, and includes the button 4110 for instructing copy setting, the button 4120 for instructing fax/scan setting, the button 4130 for instructing box operation, the button 4140 for instructing address book setting, the button 4150 for instructing simple security setting, and the button 4160 for instructing calling of a setting menu.

The number of horizontal pixels MFP$_{width}$ and the number of vertical pixels MFP$_{height}$ of the MFP panel are acquired from the model of the connected image processing apparatus and the resolution of the touch panel display 1001 of the selected image processing apparatus (step S204). Hereinafter, the model of the image processing apparatus is displayed (step S205), and the process proceeds to a loop of steps S207 to S208.

Step S208 is a determination as to whether the operation information including E_BTNx and E_BTNy is output by the RPA tool. When it is output (Yes in step S208), in step S211, the coordinates MFP$_X$ and MFP$_Y$ are calculated from the coordinates E_BTN$_x$ and E_BTN$_y$ of the location to be operated in the active window, the number of horizontal pixels E_WIN$_{width}$ and the number of vertical pixels E_WIN$_{height}$ constituting the resolution of the touch panel display 1001, the number of horizontal pixels MFP$_{width}$ and the number of vertical pixels MFP$_{height}$ constituting the resolution of the touch panel display 1001 on the basis of the following Mathematical Formula 1 (step S211).

$$MFP_x = E\_BTNx \cdot \frac{MFP_{width}}{E\_WIN_{width}} \qquad \text{[Mathematical Formula 1]}$$

$$MFP_y = E\_BTNy \cdot \frac{MFP_{height}}{E\_WIN_{height}}$$

Operation information including the coordinates $MFP_x$ and $MFP_y$ and the operation information is output to the image processing apparatus 1000 (step S212).

Step S207 is a determination as to whether the image data indicating the operation screen after update has been received. When it is received (Yes in step S207), the remote panel is updated using the image data indicating the operation screen after update (step S213), and the process returns to the loop of steps S206 to S208.

(5-3) Generation of Operation Script by RPA Tool 2500

In the RPA tool 2500, one is set to a variable i (step S102 in FIG. 7), and the process proceeds to a loop including steps S103 to S112.

Step S103 is a determination as to whether an operation has been performed on the remote panel. When the operation has been performed (Yes in step S103), it is determined whether the operation performed on the remote panel involves designation of location (step S104).

In a case where the designation of location is not involved (No in step S104), the operation script indicating the same operation as the operation performed by the operator is set as the operation script forming an i-th procedure (step S105).

In a case where the designation of location is involved (Yes in step S104), the operation script indicating the same operation as the operation performed by the registrant at the position indicated by the variables E_BTNx and E_BTNy is set as an operation script forming the i-th procedure (step S106).

A script indicating a normalized position of the operation target to be operated is generated. The script indicating the normalized position of the operation target to be operated is the following scripts 1) to 5), and these are set as the script forming the i-th procedure (step S107).

1) Script that sets the number of horizontal pixels and the number of vertical pixels of the active window to the variables $E\_WIN_{width}$ and $E\_WIN_{height}$, 2) Script that sets the number of horizontal pixels and the number of vertical pixels of the window at the time of creating the script to the variables $M\_WIN_{width}$ and $M\_WIN_{height}$, 3) Script that sets the upper left reference X coordinate and the upper left reference Y coordinate at the time of creating the script to the variables $M\_WIN_x$ and $M\_WIN_y$, 4) Script that sets the in-window X coordinate and Y coordinate pointed in the remote panel to the variables $M\_BTN_x$ and $M\_BTN_y$, and 5) Script of calculation formula for deriving variables $E\_BTN_x$ and $E\_BTN_y$ from variables $M\_BTN_x$ and M_BTNy After the above script is generated, the remote panel application 2400 is caused to update the screen and output the operation information to the image processing apparatus 1000. In step S108, a value of $M\_WIN_{width}$ is set to $E\_WIN_{width}$ indicating the number of horizontal pixels of the window and a value of $M\_WIN_{height}$ is set to $E\_WIN_{height}$ indicating the number of vertical pixels, a value of $M\_BTN_x$ is set to a variable $E\_BTN_x$, and a value of $M\_BTN_y$ is set to a variable $E\_BTN_y$. Thereafter, the operation information is output to the remote panel application 2400 (step S109). The operation information includes E_BTNx and E_BTNy calculated by the script described above. Thereafter, it is waited until the remote panel is updated by the i-th operation (No in step S110).

Figure 9B:
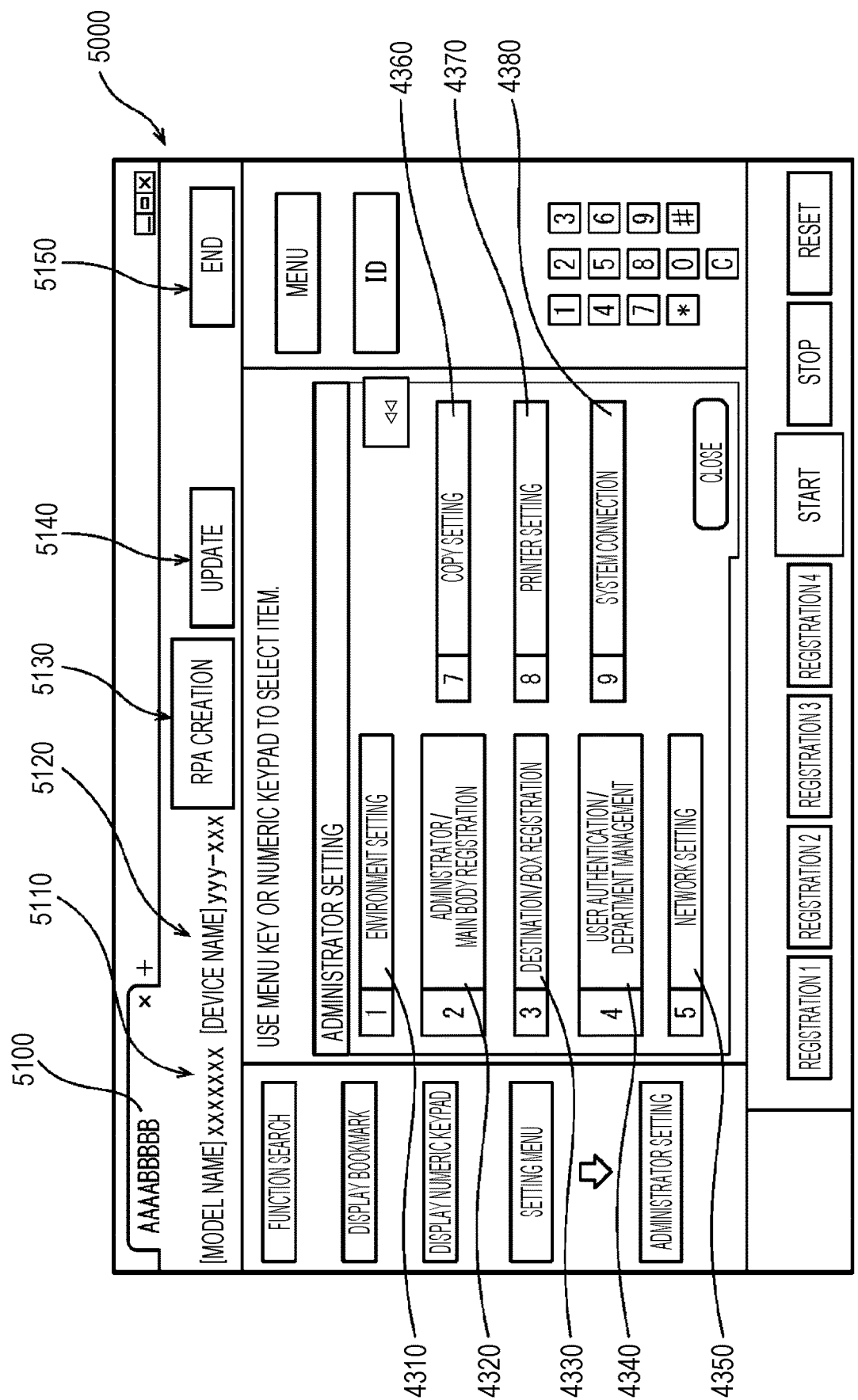
FIG. 9B is a screen displayed on an RPA terminal when a button for calling a setting menu is touched.

FIG. 9B is a screen displayed on the terminal device 2000 when the button 4160 for calling the setting menu is touched, and a button 4310 for receiving environment settings, a button 4320 for receiving administrator/main body registration, a button 4330 for receiving destination/box registration, a button 4340 for receiving user authentication/department setting, a button 4350 for receiving network setting, a button 4360 for receiving copy setting, a button 4370 for receiving printer setting, and a button 4380 for receiving system connection are arranged.

When the remote panel is updated (Yes in step S110), it is determined whether an instruction of creation end has been given by pressing the stop key (step S111). In a case where the instruction of creation end has not been given (No in step S111), the variable i is incremented (step S112), and the process returns to step S103. Hereinafter, the processing of steps S103 to S112 is repeated until the operation of creation end is performed.

When the processing of creation end is performed (Yes in step S111), the operation script representing the procedure created so far is stored as the RPA script data (step S113).

(5-4) RPA Script Data Execution Procedure

FIG. 10 is a flowchart illustrating an RPA script data execution procedure. First, in step 301, connectable image processing apparatuses (in FIG. 1, image processing apparatuses 1000, 1010, and 1020 are illustrated) are displayed in a list (step S301), and it is waited for one of the image processing apparatuses to be selected (No in step S302). When it is selected (Yes in step S302), as in step S101 in FIG. 7, the window including the RPA menu bar and the title bar is opened, the selected image processing apparatus is designated, and the remote panel application is started (step S303). By such designation, the remote panel application 2400 receives image data indicating the screen of the selected image processing apparatus (Yes in step S202 in FIG. 8), and performs window display by the window opened by the RPA tool 2500 and the selected remote panel (step S203 in FIG. 8).

In subsequent step S304 of FIG. 10, the RPA script data stored in the HDD 2005 is displayed in a list and provided to the operator. In step S305, it is determined whether any piece of the RPA script data is selected by the operator.

When any piece of RPA script data is selected (Yes in step S305), the RPA execution button is enabled (step S306), and then it is waited for the RPA execution button to be pressed (No in step S307). When the RPA execution button is pressed (Yes in step S307), one is set to the variable i (step S308), and a loop including steps S309 to S311 is executed.

In this loop, the script forming the i-th procedure of the RPA script data is executed (step S309), it is determined whether the variable i falls below the total number m (step S310), and when the variable i falls below the total number m (Yes in step S310), the procedure of incrementing the variable i (step S311) and returning to step S309 is repeated. Since the condition for continuing the loop is that i falls below m, the processing returns to step S309 until i changes from 1 to m-1, and when i becomes m, step S310 becomes No and the processing is terminated.

(5-5) Case where Created RPA Script Data is Used by Another Device

A case will be described in which, after the terminal device 2000 is caused to display the same remote panel as the operation screen of the image processing apparatus 1000 and the RPA script data is created for the remote panel, the terminal device 2000 is connected to the image processing apparatus 1010, and the terminal device 2000 executes the RPA script data.

This is a case where the image processing apparatus 1010 is selected when the image processing apparatuses are displayed in a list in step S301 in FIG. 10. In this case, the remote panel application 2400 arranges the remote panel corresponding to the operation screen of the image processing apparatus 1010 in the window opened by the RPA tool 2500 in step S203 of FIG. 8, acquires the model of the connected image processing apparatus and the numbers of horizontal pixels and vertical pixels of the touch panel display in step S204, and stores the acquired numbers of horizontal pixels and vertical pixels in the variables $MFP_{width}$ and $MFP_{height}$ described above.

The remote panel is displayed on the remote panel application 2400. As described above, since the screen resolution of the touch panel display 1011 of the image processing apparatus 1010 is different from the screen resolution of the touch panel display 1001 of the image processing apparatus 1000, the remote panel of the image processing apparatus 1010 is arranged in a window having a size different from that of the remote panel of the image processing apparatus 1000.

After the remote panel is displayed in the above process, when the RPA script data to be executed is selected, scripts constituting individual procedures of the RPA script data are executed by step S309 of FIG. 10.

Among such scripts, the scripts 3511, 3512, 3513, 3210, and 3220 illustrated in FIG. 5B are scripts that normalize and indicate the position of the operation target to be operated, and in-window coordinates are calculated by executing these scripts.

Specifically, by executing the scripts 3511 to 3513, the number of horizontal pixels and the number of vertical pixels of the current remote panel arranged in the active window are calculated and set to $E\_WIN_{width}$ and $E\_WIN_{height}$. The script 3210 calculates coordinates in the window to be an operation target from the ratio between $E\_WIN_{width}$ and $M\_WIN_{width}$ and stores the coordinates in the window to be operated in $E\_BTN_x$, and the script 3220 calculates coordinates in the window to be operated from the ratio between $E\_WIN_{height}$ and $M\_WIN_{height}$ and stores the coordinates in the window to be operated in $E\_BTNy$.

In this manner, after the coordinates are set to $E\_BTNx$ and $E\_BTNy$, a click event is generated by the script 3110.

On the other hand, in step S211 of FIG. 8, the remote panel application 2400 calculates the coordinates $MFP_x$ and $MFP_y$ by performing the calculation of Mathematical Formula 1 described above using the variable $MFP_{width}$ indicating the number of horizontal pixels acquired from the image processing apparatus 1010, the variable $MFP_{height}$ indicating the number of vertical pixels acquired from the image processing apparatus 1010, $E\_WIN_{width}$ indicating the number of horizontal pixels of the current remote panel, and $E\_WIN_{height}$ indicating the number of vertical pixels of the current remote panel, and instructs the image processing apparatus 1010 that the coordinates have been touched.

Through the above process, the image processing apparatus 1000 can be remotely operated from the terminal device 2000 using the RPA script data created for the image processing apparatus 1010. The same applies to a case of operating the remote panel of the image processing apparatus 1020.

[6] Summary

As described above, according to the present embodiment, in the RPA script data, the script that sets the number of horizontal pixels and the number of vertical pixels of the window when the RPA script data is created as variables, the script that normalizes and indicates the coordinates in the window of a location touched by the user at the time of creating the RPA script data, and the script that recalculates the coordinates are generated in the RPA script data, and thus, when executing the RPA script data, the remote panel can be displayed using the window and execution of the operation procedure defined by the RPA script data can be commanded without being conscious of the size of the window for displaying the remote panel.

[3] Second Embodiment

In the first embodiment, the script that substitutes the coordinates operated in the window into the variables M_BTNx and M_BTNy is generated, but the execution of the RPA script data including such a script may end with an error due to some accident. The present embodiment relates to error handling in a case where execution of RPA script data ends with an error. Specifically, in the present embodiment, error elimination is attempted by increasing the waiting time until one procedure of the RPA script data is instructed.

Figure 11:
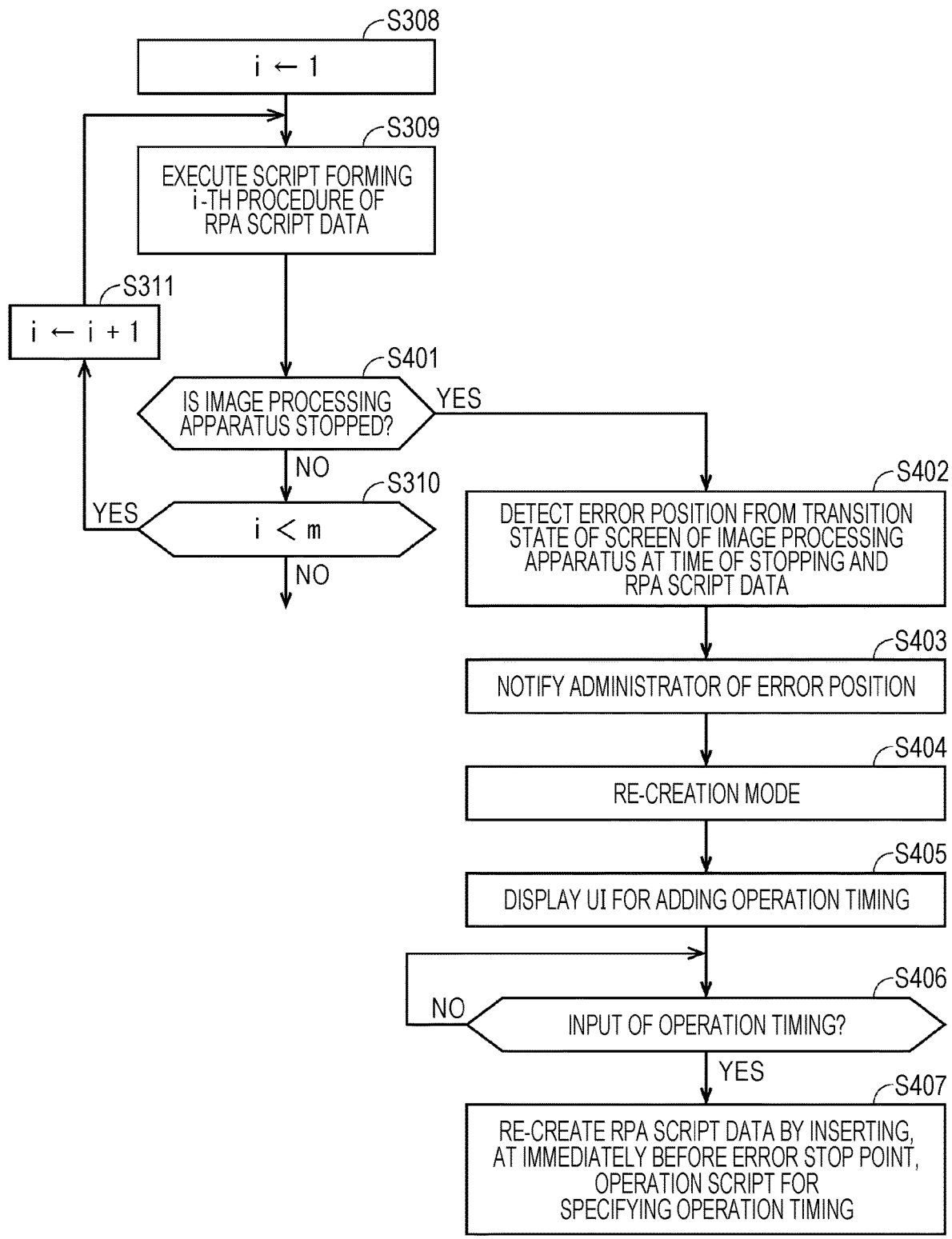
FIG. 11 is a flowchart illustrating a processing procedure of the RPA tool according to a second embodiment.

FIG. 11 is a flowchart illustrating a processing procedure of the RPA tool 2500 according to the second embodiment. This flowchart is based on the flowchart of FIG. 10 and is different from the flowchart of FIG. 10 in that step S401 as a determination step is inserted between step S309 and step 310, and steps S402 to S407 are added as processing to be executed when step S401 becomes Yes.

In step S401, after the script forming the i-th procedure of the RPA script data is executed and an operation is instructed from the terminal device 2000 to the image processing apparatus 1000 in step S309, it is determined whether the image processing apparatus remains stopped without performing processing. In a case where the operation of the image processing apparatus is not stopped, the loop of steps S309 to S311 and step S401 is repeated.

In a case where the image processing apparatus 1000 is stopped (Yes in step S401), an error position is detected from the transition state of the screen of the image processing apparatus when it is stopped and the RPA script data (step S402), and the error position is notified to the administrator (step S403). Thereafter, the terminal device is set to the re-creation mode (step S404), a screen for adding the operation timing (operation timing designation screen) is displayed (step S405), and the input of the operation timing is received (step S406).

Figure 12:
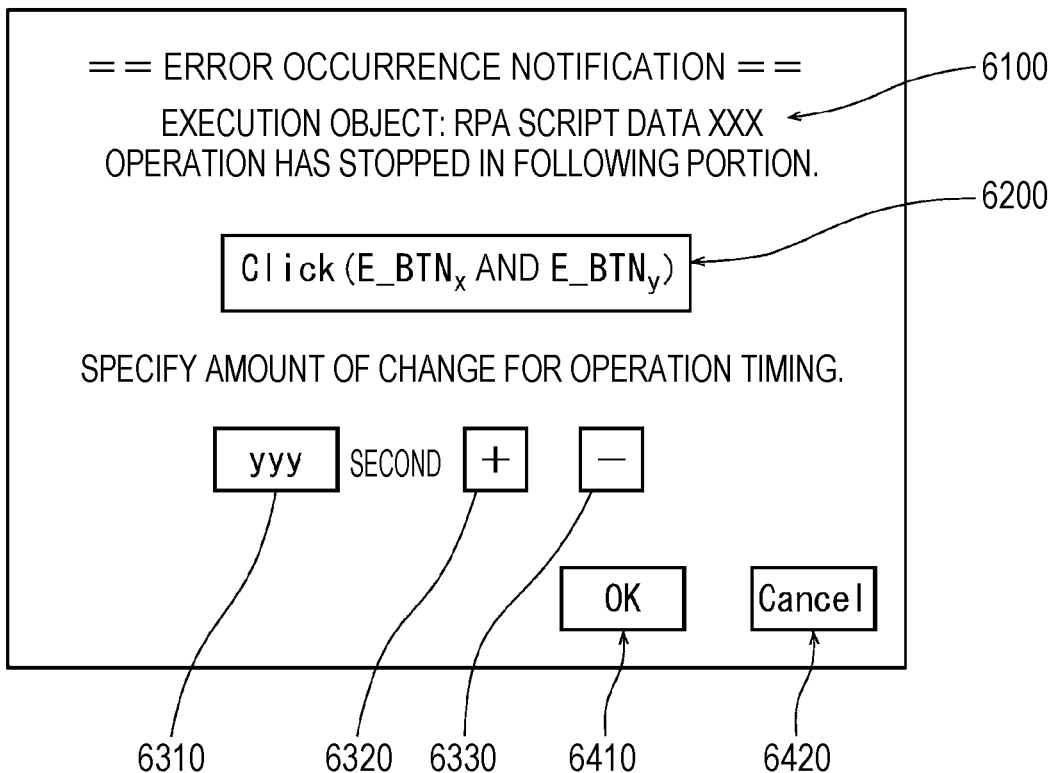
FIG. 12 is a diagram illustrating an example of a waiting time designation screen.

FIG. 12 illustrates an example of the operation timing designation screen. The operation timing designation screen in this drawing includes a display 6100 of the RPA script data to be executed, a display 6200 of an error position in the RPA script data, and a waiting time display field 6310. In the waiting time display field, the set waiting time is clearly indicated at the error position. The +key 6320 and the −key 6330 receive an operation of increasing or decreasing the waiting time. That is, the pressing of the +key 6320 increases the waiting time, and the pressing of the −key 6330 decreases the waiting time. By repeating the pressing of these keys, the appropriate waiting time can be adjusted to an appropriate value.

The OK button 6410 receives an operation of confirming the waiting time displayed in the waiting time display field. The Cancel button 6420 receives an operation of returning the waiting time displayed in the waiting time display field to the original value.

Figure 13:
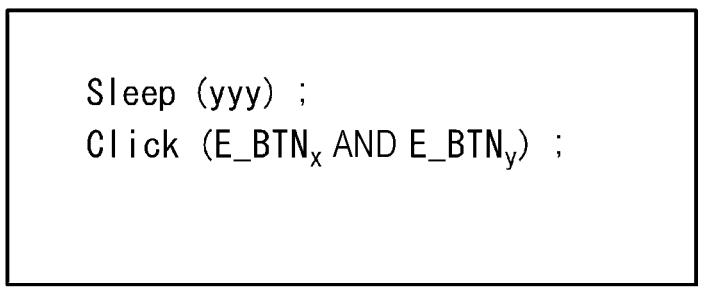
FIG. 13 illustrates an operation script inserted immediately before an error stop position by specifying a waiting time.

When the waiting time is specified using the operation timing designation screen of FIG. 12, Yes is selected in step S406, and an operation script that designates the operation timing is inserted immediately before an error stop position in step S407. In the error position field on the operation timing designation screen of FIG. 12, if the operation of the image processing apparatus is stopped at the time of executing the operation script Click ($E\_BTN_x$ and $EBTN_y$), an operation script Sleep (yyy) for delaying the execution of Click (E_BTNx and E_BTNy) by the waiting time designated on the operation timing designation screen of FIG. 12 is inserted as illustrated in FIG. 13.

By inserting such an operation script, the re-creation and storage of the RPA script data are completed, and the processing of this flowchart is terminated.

As described above, according to the present embodiment, after the RPA script data is executed, it is determined whether or not the processing of the image processing apparatus 1000 is stopped, and in a case where the processing is stopped, the operation script that has become the error position is specified, and the RPA script data is recreated so as to delay the execution of the operation script that has caused the operation stop of the image processing apparatus by the waiting time. Therefore, the quality of the RPA script data can be improved each time the execution is repeated.

[7] Modification

Although the present invention has been described on the basis of the embodiments, it is needless to say that the present invention is not limited to the above-described embodiments, and the following modification examples are conceivable.

(1) The terminal device 2000 includes a type in which the display can be replaced and a type in which the resolution of the display can be changed, and in such a type of terminal device, the resolution of the display may be different between the time when the RPA script data is created and the time when the RPA script data is executed. In this case, the in-window coordinates $E\_BTN_x$ and $E\_BTN_y$ may be calculated by the following Mathematical Formula 2 using the number of horizontal pixels $M\_SCN_{width}$ and the number of vertical pixels $M\_SCN_{height}$ of the screen resolution of the LCD 2001 at the time of creating the RPA script data, and the number of horizontal pixels $E\_SCN_{width}$ and the number of vertical pixels $E\_SCN_{height}$ of the screen resolution of the LCD 2001 at the time of executing the RPA script data.

[Mathematical Formula 2]
$$E\_BTN_x = (M\_BTNx - M\_EWIN_x) \cdot \frac{M\_SCN_{width}}{M\_WIN_{width}} \cdot \frac{E\_WIN_{width}}{E\_SCN_{width}}$$

$$E\_BTN_y = (M\_BTNy - M\_EWIN_y) \cdot \frac{M\_SCN_{height}}{M\_WIN_{height}} \cdot \frac{E\_WIN_{height}}{E\_SCN_{height}}$$

(2) Instead of using the remote panel application 2400, the RPA tool 2500 may calculate coordinates on the touch panel display 1001 and instruct the MFP 1000 on an operation to be executed. In a case where the resolution of the LCD 2001 does not change between the time of creating the RPA script data and the time of executing the RPA script data, the RPA tool 2500 may obtain the X coordinate $MFP_x$ and the Y coordinate $MFP_y$ of the operation position in the touch panel display 1001 by executing calculation of Mathematical Formula 3 using the number of horizontal pixels $MFP_{width}$ and the number of vertical pixels $MFP_{height}$ constituting the resolution of the touch panel display 1001.

[Mathematical Formula 3]
$$MFP_x = (M\_BTNx - M\_EWIN_x) \cdot \frac{MFP_{width}}{M\_WIN_{width}}$$

$$MFP_y = (M\_BTNy - M\_EWIN_y) \cdot \frac{MFP_{height}}{M\_WIN_{height}}$$

(3) In a case where the resolution of the LCD 2001 changes between the time of creating the RPA script data and the time of executing the RPA script data, the X coordinate $MFP_x$ and the Y coordinate $MFP_y$ of the operation position in the touch panel display 1001 are obtained by executing calculation of the following Mathematical Formula 4.

[Mathematical Formula 4]
$$MFP_x = (M\_BTNx - M\_EWIN_x) \cdot \frac{M\_SCN_{width}}{M\_WIN_{width}} \cdot \frac{MFP_{width}}{E\_SCN_{width}}$$

$$MFP_y = (M\_BTNy - M\_EWIN_y) \cdot \frac{M\_SCN_{height}}{M\_WIN_{height}} \cdot \frac{MFP_{height}}{E\_SCN_{height}}$$

(4) A script file including the RPA script string created by the RPA tool 2500 in the RPA creation mode is written and stored in the HDD 2005 of the terminal device 2000, but the present invention is not limited thereto. The script file including the RPA script string created by the RPA tool 2500 in the RPA creation mode may be transmitted to the image processing apparatus 1000 and stored in the image processing apparatus 1000. In the RPA execution mode, among files stored in the internal storage of the image processing apparatus 1000, files to which an extension specific to the script file is attached are read and provided for display in a list on the LCD 2001 of the terminal device 2000. Then, one selected by the user from the RPA script strings displayed in a list may be executed.

In addition, the script file including the RPA script string created by the RPA tool 2500 in the RPA creation mode may be written and stored in the storage of the server device in the external network.

(5) In the above embodiment, the RPA tool 2500 is started on the terminal device 2000 and the RPA tool 2500 is caused to execute the RPA script data, but the present invention is not limited thereto. A program file of the RPA tool 2500 that creates and executes the RPA script data may be installed in the image processing apparatus 1000, and creation and execution of the RPA script data may be performed on the image processing apparatus 1000 according to an instruction from the terminal device 2000.

The image processing apparatus 1000 of the present modification includes a server function and a browser function, and receives an operation from a user through a screen of the browser. In the present modification, the browser of the terminal device 2000 issues an RPA script data creation request to the RPA tool 2500 of the image processing apparatus 1000 to start the RPA tool 2500, generates a script that stores the upper left X coordinate of the window in a variable, a script that stores the upper left Y coordinate in a variable, a script that stores the number of horizontal pixels of the window in a variable, a script that stores the number of vertical pixels in a variable, and a script that stores the touch coordinates in the window in a variable, which are described in the above embodiment, and stores the RPA script data including these scripts in the HDD 1005 of the image processing apparatus 1000.

When execution of the RPA script data is requested from the browser of the terminal device 2000, the RPA script data saved in the HDD 1005 is displayed in a list, and selection of the RPA script data to be executed is received. When the RPA script data to be executed is selected, the selected RPA script data is executed.

(6) Although the operation script that calculates the number of horizontal pixels and the number of vertical pixels of the window in which the operation screen is arranged is included in the RPA script data, the present invention is not limited thereto. When the RPA tool executes the RPA script data, the number of horizontal pixels and the number of vertical pixels of the window in which the operation screen is arranged may be calculated.

(7) The display size is represented by the number of horizontal pixels and the number of vertical pixels of the window, but is not limited thereto. When the RPA script data is created, the display size may be expressed by a scaling ratio of the window in which the remote panel is arranged. When it is the same ratio as that of the desktop screen 4002, the scaling ratio is represented by 100%. When it is 1/n (n is an integer of 2 or more) of the desktop screen, the scaling ratio is represented by 1/n. The resolution of the image processing apparatus is represented by the set of the number of horizontal pixels and the number of vertical pixels, but is not limited thereto. The resolution may be represented by the number of dots per inch (dpi).

(8) In the second embodiment, in a case where the image processing apparatus stops due to the execution of the RPA script data, the administrator is notified of the error position and the RPA script data is recreated, but it is not limited thereto. The re-creation of the RPA script data may be executed by automatically inserting the waiting time.

Figure 14:
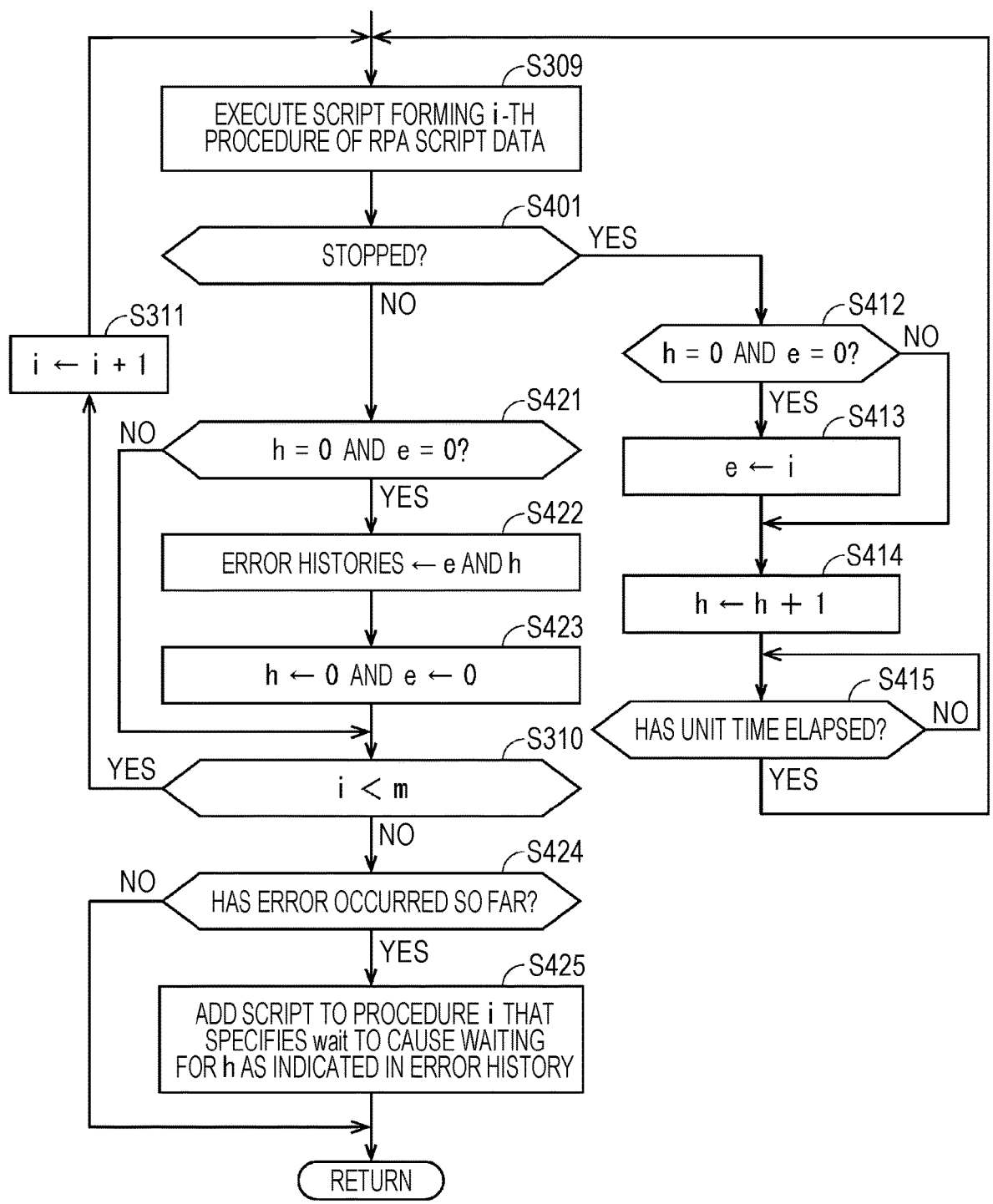
FIG. 14 is a flowchart illustrating a processing procedure of the RPA tool according to the second embodiment.

FIG. 14 is a flowchart illustrating a processing procedure of the RPA tool 2500 according to a modification of the second embodiment. This drawing is based on FIG. 10, and is different from the second embodiment in that steps S401, steps S412 to S415, and steps S421 to S423 are inserted between step S309 and step S310, and steps S424 and S425 are added next to step S310.

A variable h is a counter variable for counting the number of times of error occurrence, and zero is set as an initial value. A variable e is a variable indicating a procedure in which an error has occurred, and the variable i when the error has occurred is copied.

Step S412 is a determination step executed when the image processing apparatus is stopped and it is determined as Yes in step S401, and it is determined whether the variable h is zero. When it is the first time that an error has occurred in the i-th procedure and h=0 (Yes in step S412), the variable i indicating the current procedure is set to the variable e indicating an error occurrence location (step S413). Thereafter, the variable his incremented (step S414).

Subsequently, in step S415, the processing waits for a predetermined unit time to elapse (No in step S415). When the time has elapsed (Yes in step S415), the process proceeds to step S309 again, and a script forming the i-th procedure is issued. Hereinafter, as long as the error continues to occur, the waiting of the unit time and the instruction of the i-th procedure are repeated. Once the instruction is issued, the variable h is incremented. Step S401 becomes No. When the error is eliminated by repeating the waiting of the unit time and the instruction of the i-th procedure, it is determined in step S421 whether the variables e and h are zero.

When the variables h and e are zero, steps S422 and S423 are skipped, and the process proceeds to step S310. When they are zero, the variables e and h are left as error histories (step S422), the variables h and e are set to zero (step S423), and the process proceeds to step S310. Hereinafter, as in the first embodiment, steps S309 to S311 and steps S421 to S423 are repeated until the variable i becomes the prime number m.

Thereafter, when No is selected in step S310 and all the scripts defined by the RPA script data are executed, it is determined in step S424 whether an error has occurred in the process of executing the RPA script data so far. When an error occurs (Yes in step S424), a script that causes waiting for the unit time x h is added before the script forming the i-th procedure (step S425).

(9) In the above modification, when an error occurs, waiting is increased according to the number of times of occurrence of the error to eliminate the error. On the other hand, in the present modification, in a case where an error occurs in a procedure instruction to the image processing apparatus 1000 after the coordinate instruction is given to the image processing apparatus 1000, the in-window X coordinate and the in-window Y coordinate are incremented, thereby eliminating the error.

Figure 15:
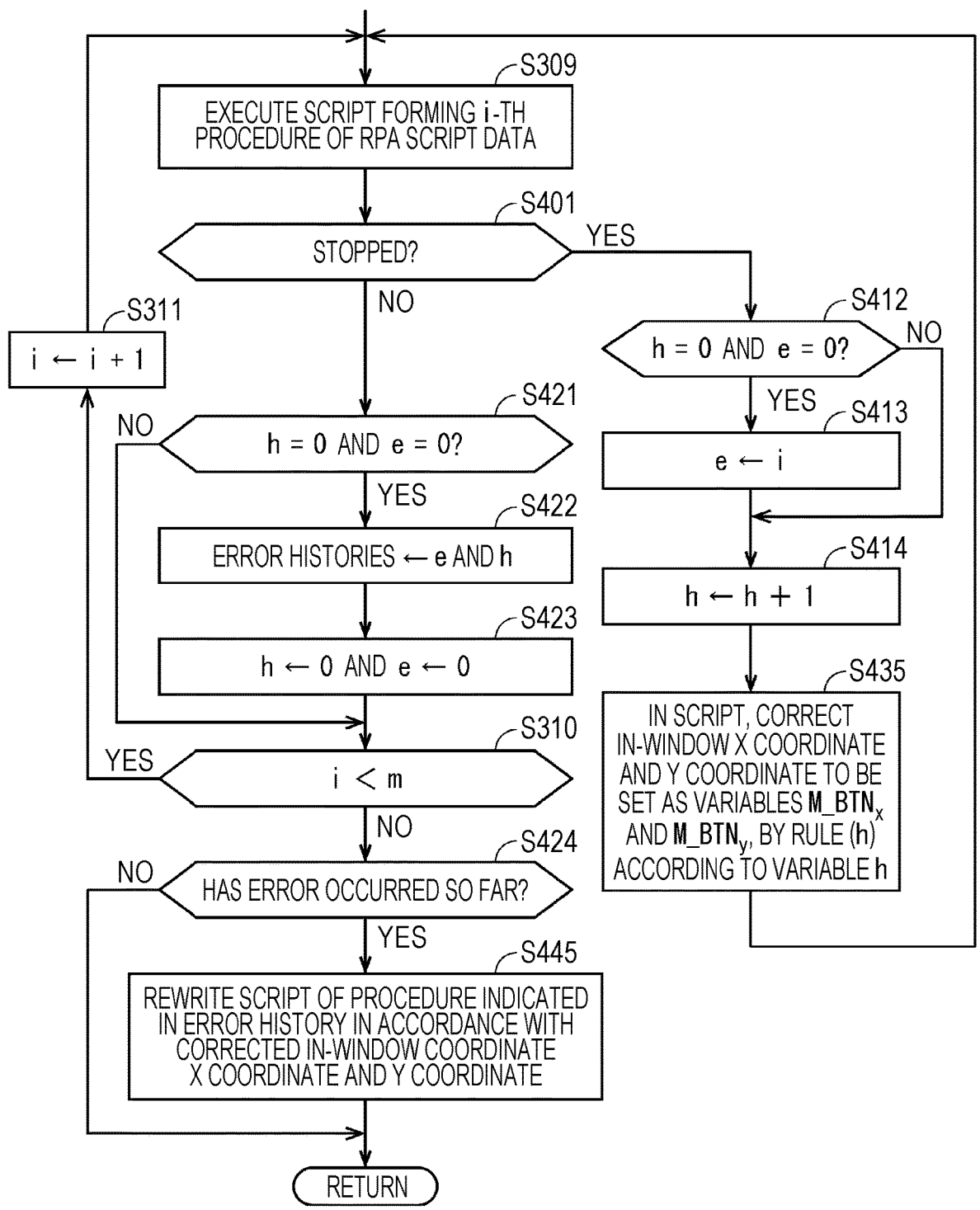
FIG. 15 is a flowchart illustrating a processing procedure of the RPA tool according to a modification.

FIG. 15 is a flowchart illustrating a processing procedure of the RPA tool 2500 according to the modification. FIG. 15 is different from FIG. 14 in that step S415 is replaced with step S435 and step S425 is replaced with step S445. Specifically, in a case where it is determined in the i-th procedure of the RPA script data that the image processing apparatus has stopped (Yes in step S401), the variable h is incremented (step S414), and then, in the script forming the i-th procedure, the in-window X coordinate and Y coordinate to be set as the variables M_BTNx and M_BTNy are corrected by rule (h) according to the variable h (step S435), and the procedure returns to step S309. The rule (h) is a rule of increasing the in-window X coordinate and the in-window Y coordinate according to the variable h. Specifically, when the variable h is an odd number, the in-window X coordinate is increased by the odd number. When the variable h is an even number, the in-window Y coordinate is increased by the even number value. Therefore, as the variable h increases, the in-window X coordinate increases in the rightward direction and the in-window Y coordinate increases in the downward direction.

Every time an error occurs, the in-window X coordinate and Y coordinate to be set to the variables M_BTNx and M_BTNy are changed according to the variable h, and the process returns to step S309. By repeating such processing, the in-window X coordinate and Y coordinate to be set in M_BTNx and M_BTNy increase. In this manner, when the in-window X coordinate and the in-window Y coordinate increase, the probability that the position where the GUI member is present can be correctly pressed in the remote panel increases. When the error no longer occurs as a result of executing the script of the procedure i by repetition of steps S309, S401, steps S412 to S414, and step S435 (No in step S401), the process proceeds to step S421. In step S421, it is determined whether the variable h is zero and e is zero, and when these variables are not zero, the variable e is indicated in the error history (step S422), and then zero is set to the variables h and e (step S423). Further, after step S401 becomes No and the loop of steps SS309 to S311, step S401, and steps S421 to S423 is eliminated, it is determined whether an error has occurred so far (step S424). When an error has occurred so far (Yes in step S424), the script of the procedure indicated in the error history is rewritten in accordance with the corrected window coordinate system X coordinate and window Y coordinate (step S445), and the process returns to the main flow.

(10) As the script, Python (registered trademark), VB Script (registered trademark), VB.NET (registered trademark), GAS (registered trademark), and C#(registered trademark) can be used.

VB Script (registered trademark) is a language also used in WinActor. VB.NET (registered product) is a visual basic language used in UiPath, and is suitable for operating the Microsoft Office products (registered trademark).

GAS (Google App Script: registered trademark) is a programming language developed on the basis of JavaScript (registered trademark), and can cooperate and operate services such as Google (registered trademark) map, mail, and spreadsheet.

C#(registered trademark) is a programming language developed by Microsoft Corporation, and can use an API for operating Windows (registered trademark).

The present invention is not limited thereto, and other programming languages may be used as long as the programming languages can be executed without compiling and linking.

(11) The type of paper loaded in a paper feeding cassette may be automatically set by describing paper setting according to a detection result by a medium sensor in the RPA script data and causing the RPA tool 2500 to execute the setting. The medium sensor measures the reflectance of green (G) light, the transmittance of near-infrared light (Ir), the transmittance of blue light (B), and the transmittance of ultrasonic waves by an optical sensor, an infrared sensor, and an ultrasonic sensor, and determines whether the type of paper used for printing is recycled paper, coated paper, or an envelope from these reflectances and transmittances. At the time of detection by the medium sensor, a character string indicating the paper type detected in this manner is displayed on the screen, and thus the detected character string is set to the paper type of the corresponding paper feeding cassette. In this manner, it is possible to reflect the detection result by the medium sensor on the paper type of the paper feeding cassette without manual operation. A script that sets, as variables, the in-window coordinates and the window upper left coordinates of the location where the detection result of the medium sensor is displayed, a script that sets, as variables, the in-window coordinates and the window upper left coordinates of the location where the paper type of the paper feeding cassette is set may be generated in the RPA script data, and the apparatus setting may be performed by such RPA script data.

In addition, such a detection result may be registered as sheet information of the image processing apparatus in a server that manages the image processing apparatus.

(12) In the terminal device 2000, a mouse and a keyboard are used as the pointing device that receives the user's operation, but the pointing device is not limited thereto. A keypad or a stylus may be used. The terminal device 2000 has been described as a laptop personal computer but is not limited thereto. The terminal device may be any of a desktop personal computer, a smartphone, a tablet terminal, and a cash register terminal operated with a mouse, a keypad, or the like.

(13) Note that an example of the MFP, SFP, and MO, which are image forming apparatuses, has been described as the image processing apparatus, but it is not limited thereto. A single-function scanner or a facsimile machine may be used. It may be provided in a production printing apparatus, or may be provided in a label printer, a postcard printer, or a ticket issuing machine. Alternatively, it may be provided in a single-function copier or a single-function peripheral device (printer) of a personal computer.

According to an embodiment of the present invention, device settings when an image processing apparatus is introduced into a business establishment and panel settings when a job is executed in the image processing apparatus can be automated by using RPA in a terminal device, and thus there is a possibility to be used in an industrial field of OA equipment and information equipment, as well as industrial fields of various types of business such as a retail industry, a rental industry, a real estate industry, an advertisement industry, a transportation industry, and a publishing industry.

The position information indicates a detected position of an operation target to be operated in a normalized manner on the basis of a size of an operation screen when the position is detected, and thus, in a case where the size of the operation screen is changed, it is possible to give an appropriate instruction of a position to perform an operation by RPA after the size is changed.

Although embodiments of the present invention have been described and illustrated in detail, the disclosed embodiments are made for purposes of illustration and example only and not limitation. The scope of the present invention should be interpreted by terms of the appended claims.

What is claimed is:

1. A method for creating robotic process automation (RPA) script data to perform an operation in a terminal device that displays an operation screen for an image processing apparatus on a host terminal and receives the operation by the RPA, the method comprising:
   detecting a position of an operation target displayed on the operation screen and selected by an operator; and
   normalizing the detected position of the operation target on a basis of a size of the operation screen, generating position information indicating the normalized position, and describing the position information in the RPA script data.

2. The method for creating RPA script data according to claim 1, wherein
   the terminal device performs window display of the operation screen, and
   the normalization of the position of the operation target in the normalizing is performed using a display size at time of performing the window display of the operation screen and in-window coordinates of the position of the operation target to be operated.

3. The method for creating RPA script data according to claim 2, wherein
   the normalizing includes:
   generating a script that acquires a size of the window display, and
   generating a calculation script that calculates the in-window coordinates indicating the position of the operation target by using the acquired size of the window display and the normalized position of the operation target indicated in the position information, and describing the calculation script in the RPA script data.

4. The method for creating RPA script data according to claim 3, wherein
   the RPA script data includes resolution information indicating a screen resolution of the terminal device at time of detecting the position of the operation target to be operated, and
   the calculation script generated by the normalizing uses, to calculate the in-window coordinates, a ratio between a screen resolution indicated in the resolution information of the RPA script data and the screen resolution of the terminal device at time of executing the RPA script data.

5. The method for creating RPA script data according to claim 1, wherein
   the normalizing includes
   generating a calculation script that calculates coordinates in the operation screen of the image processing apparatus by using a screen resolution of the image processing apparatus and the normalized position of the operation target indicated in the position information, and describing the calculation script in the RPA script data.

6. A terminal device, comprising:

a hardware processor that:

receives a bitmap representing an operation screen of an image forming apparatus from the image processing apparatus;

writes and displays the received bitmap in a video random access memory (VRAM);

receives, from an operator, designation of a position to be an operation target in the bitmap written in the VRAM when registering an operation to be executed by RPA; and obtains position information indicating a designated position by normalizing the designated position according to a size of the displayed bitmap, and generates RPA script data describing the position information.

* * * * *